US008880397B2

(12) United States Patent
Almaer et al.

(10) Patent No.: US 8,880,397 B2
(45) Date of Patent: Nov. 4, 2014

(54) SYSTEMS, DEVICES AND METHODS FOR LIST DISPLAY AND MANAGEMENT

(75) Inventors: Dion Almaer, Palo Alto, CA (US); Bernard Paul Cousineau, Burlingame, CA (US); Ben Galbraith, Palo Alto, CA (US)

(73) Assignee: Wal-Mart Stores, Inc., Bentonville, AR (US)

( * ) Notice: Subject to any disclaimer, the term of this patent is extended or adjusted under 35 U.S.C. 154(b) by 473 days.

(21) Appl. No.: 13/278,977

(22) Filed: Oct. 21, 2011

(65) Prior Publication Data
US 2013/0103397 A1 Apr. 25, 2013

(51) Int. Cl.
| | |
|---|---|
| G10L 15/26 | (2006.01) |
| G06F 17/27 | (2006.01) |
| G06F 17/21 | (2006.01) |
| G10L 21/00 | (2013.01) |
| G10L 15/06 | (2013.01) |
| G10L 17/00 | (2013.01) |
| G10L 15/04 | (2013.01) |
| G10L 21/06 | (2013.01) |
| G10L 15/20 | (2006.01) |
| G10L 15/22 | (2006.01) |
| G10L 15/197 | (2013.01) |
| G10L 15/18 | (2013.01) |

(52) U.S. Cl.
CPC .......... *G10L 15/20* (2013.01); *G10L 2015/225* (2013.01); *G10L 15/22* (2013.01); *G10L 15/265* (2013.01); *G10L 15/197* (2013.01); *G10L 15/1822* (2013.01); *G10L 15/26* (2013.01)

USPC ................. 704/235; 704/9; 704/10; 704/201; 704/243; 704/246; 704/251; 704/270; 704/270.1; 704/275; 704/276

(58) Field of Classification Search
USPC ............... 704/9, 10, 201, 235, 243, 246, 251, 704/270, 270.1, 275, 276
See application file for complete search history.

(56) References Cited

U.S. PATENT DOCUMENTS

| | | | | |
|---|---|---|---|---|
| 5,786,764 | A * | 7/1998 | Engellenner | 340/572.4 |
| 6,462,616 | B1 * | 10/2002 | Beswick et al. | 379/88.03 |
| 6,497,367 | B2 * | 12/2002 | Conzola et al. | 235/462.45 |
| 6,813,341 | B1 * | 11/2004 | Mahoney | 379/88.01 |
| 7,267,281 | B2 * | 9/2007 | Hopkins | 235/462.45 |
| 7,292,678 | B2 * | 11/2007 | Glynn et al. | 379/88.04 |
| 7,762,458 | B2 | 7/2010 | Stawar et al. | |
| 7,791,471 | B2 * | 9/2010 | Glynn et al. | 340/539.13 |
| 8,600,828 | B2 * | 12/2013 | Bonner et al. | 705/26.1 |
| 8,626,611 | B2 * | 1/2014 | Bravo | 705/26.9 |
| 2002/0072970 | A1 * | 6/2002 | Miller et al. | 705/14 |
| 2006/0143007 | A1 | 6/2006 | Koh et al. | |
| 2006/0167790 | A1 * | 7/2006 | Gould et al. | 705/37 |
| 2007/0210155 | A1 * | 9/2007 | Swartz et al. | 235/383 |
| 2008/0052070 | A1 | 2/2008 | Doulton | |

(Continued)

*Primary Examiner* — Edgar Guerra-Erazo
(74) *Attorney, Agent, or Firm* — David R. Stevens; Stevens Law Group

(57) ABSTRACT

Exemplary embodiments provide systems, devices and methods that allow creation and management of lists of items in an integrated manner on an interactive graphical user interface. A user may speak a plurality of list items in a natural unbroken manner to provide an audio input stream into an audio input device. Exemplary embodiments may automatically process the audio input stream to convert the stream into a text output, and may process the text output into one or more n-grams that may be used as list items to populate a list on a user interface.

21 Claims, 16 Drawing Sheets

(56) References Cited

U.S. PATENT DOCUMENTS

| | | | |
|---|---|---|---|
| 2008/0301102 A1* | 12/2008 | Liang | 707/3 |
| 2009/0182499 A1* | 7/2009 | Bravo | 701/207 |
| 2010/0030578 A1 | 2/2010 | Siddique et al. | |
| 2010/0169098 A1 | 7/2010 | Patch | |
| 2010/0235341 A1 | 9/2010 | Bennett | |
| 2011/0054904 A1* | 3/2011 | Fenton | 704/270 |
| 2013/0253982 A1* | 9/2013 | Sciore | 705/7.29 |

* cited by examiner class Orange Juice     1400

Attributes     1402

Identifier

Size

Price

Brand

Type

Packaging

Location

Nutrition

Methods     1404 getIdentifier; setIdentifier getSize; setSize getPrice; setPrice getBrand; setBrand getType; setType getPackaging; setPackaging getLocation; setLocation getNutrition; setNutrition renderOrangeJuiceObject

*Figure 14*

SYSTEMS, DEVICES AND METHODS FOR LIST DISPLAY AND MANAGEMENT

SUMMARY

Exemplary embodiments provide systems, devices and methods that allow creation and management of lists of items in an integrated manner on an interactive graphical user interface. A user may speak a plurality of list items in a natural unbroken manner to provide an audio input stream into an audio input device. Exemplary embodiments may automatically process the audio input stream to convert the stream into a text output, and may process the text output into a sequence of a plurality of n-grams. Exemplary embodiments may automatically populate a new or existing list on a user interface with the n-grams in the sequence of n-grams so that each n-gram corresponds to a different list item. Exemplary embodiments also provide systems, devices and methods that allow display of items on a shopping list on a map of a store in order to facilitate a shopping trip.

In accordance with one exemplary embodiment, a computer-implemented method is provided for allowing creation and management of a list on a mobile computing device. The method includes rendering a user interface on a display device of the mobile computing device, and receiving user input from a user for creating a list. The method includes receiving an audio input stream from the user at an audio input device of the mobile computing device, the audio input stream including a sequence of a plurality of list items spoken by the user. The method includes, in response to receipt of the audio input stream at the audio input device, calling a speech processing engine from the user interface to process the audio input stream into input text and to parse the input text into one or more n-grams. The method includes, in response to user input accepting the one or n-grams, rendering a list on the user interface in which each n-gram is represented as a separate list item.

In accordance with another exemplary embodiment, a mobile computing system is provided. The mobile computing system includes an audio input device for receiving audio input, a visual display device configured to display one or more user interfaces and a processor. The processor is programmed to render a user interface on the visual display device and to receive user input from a user for creating a list. The processor is also programmed to receive an audio input stream from the user at the audio input device, the audio input stream including a sequence of a plurality of list items spoken by the user. The processor is also programmed to call a speech progressing engine from the user interface to process the audio input stream into input text and to parse the input text into one or more n-grams, in response to receipt of the audio input stream at the audio input device. The processor is also programmed to render representations of the one or more n-grams on the user interface to allow the user to accept, reject and/or edit the one or more n-grams for representation in the form of a list and, in response to user input accepting the one or n-grams, render a list on the user interface in which each n-gram is represented as a separate list item.

In accordance with another exemplary embodiment, one or more non-transitory computer-readable media encoded with computer-executable instructions are provided for performing a method for allowing creation and management of a list on a mobile computing device. The method includes rendering a user interface on a display device of the mobile computing device, and receiving user input from a user for creating a list. The method includes receiving an audio input stream from the user at an audio input device of the mobile computing device, the audio input stream including a sequence of a plurality of list items spoken by the user. The method includes, in response to receipt of the audio input stream at the audio input device, calling a speech processing engine from the user interface to process the audio input stream into input text and to parse the input text into one or more n-grams. The method includes, in response to user input accepting the one or n-grams, rendering a list on the user interface in which each n-gram is represented as a separate list item.

In accordance with another exemplary embodiment, a computer-implemented method is provided for a mobile computing device. The method includes receiving a list of items, and rendering a map of a store on a user interface displayed on a visual display device of the mobile computing device. The method also includes rendering representations of the list items on representations on the map of corresponding geographical locations in the store at which the list items are available. The method also includes rendering a route on the map that connects the representations of the list items to indicate a path to follow in picking up the list items in the store.

BRIEF DESCRIPTION OF THE DRAWINGS

The foregoing and other objects, aspects, features and advantages of exemplary embodiments will be more fully understood from the following description when read together with the accompanying drawings, in which:

FIG. 14 illustrates a block diagram of an exemplary "Orange Juice" class for defining an orange juice product item, e.g., a Tropicana™ orange juice product.

DETAILED DESCRIPTION

Figure 1:
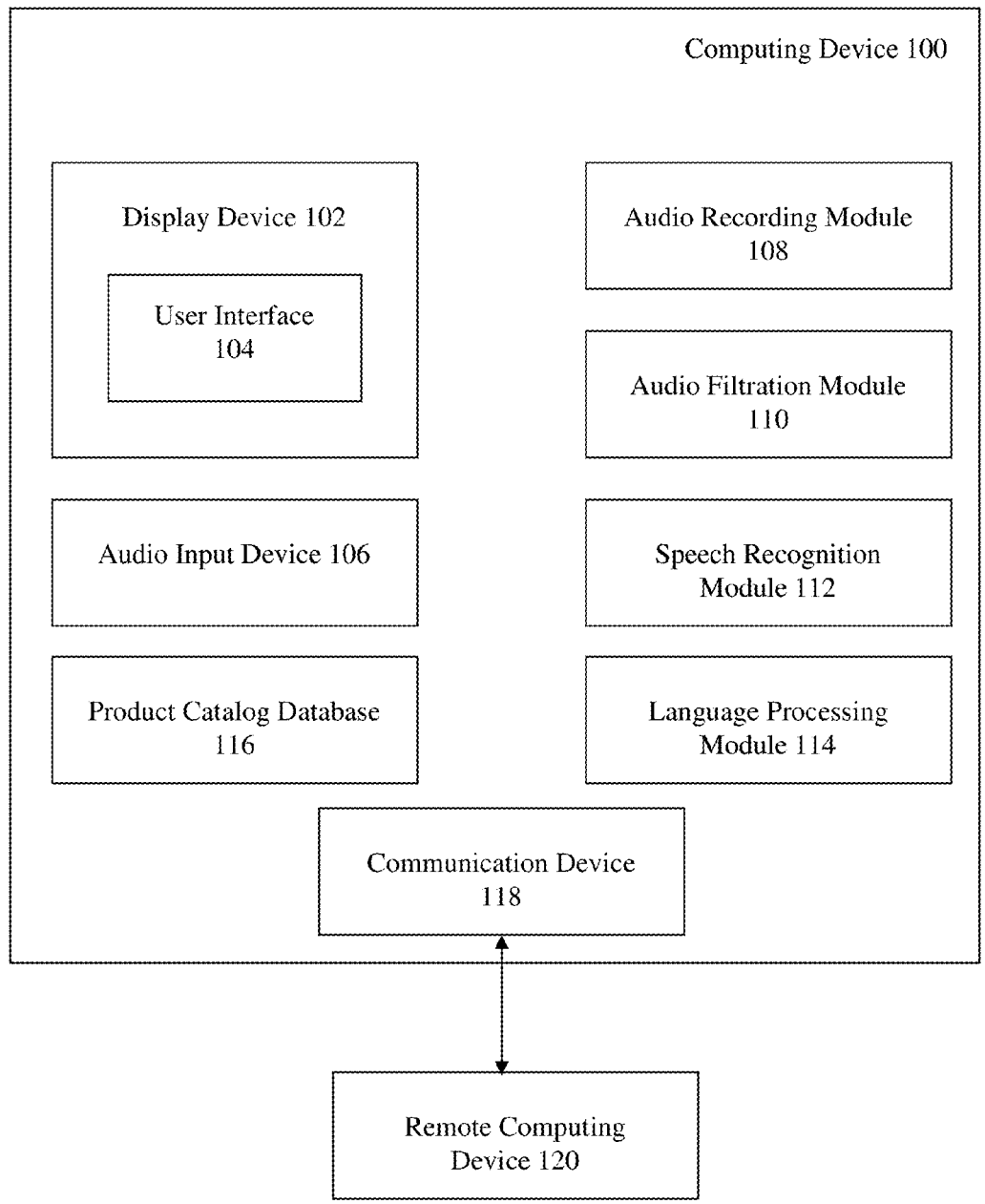
FIG. 1 is a block diagram of certain exemplary components of an exemplary computing device that may be used to implement and perform exemplary embodiments.

List management systems allow creation and management of lists of items, e.g., shopping lists, to-do lists, and the like. Certain conventional list management systems allow a user to provide audio input identifying the list items one list item at a time. As a result, these conventional systems require the user to speak the list items one item at a time and to wait between each list item input while the previous list item input is being processed, which increases the time required to create the list and makes the conventional list management system slow and user-unfriendly.

Exemplary embodiments address deficiencies of conventional list management systems that require a user to provide audio input for creating a list one list item at a time. Exemplary embodiments provide systems, devices and methods that allow creation and management of lists of items in an integrated manner on an interactive user interface. A user may speak a plurality of list items in a natural unbroken manner to provide an audio input stream into an audio input device. Exemplary embodiments may automatically process the audio input stream to convert the stream into a text output, and may process the text output into a sequence of a plurality of n-grams. Exemplary embodiments may automatically populate a new or existing list on a user interface with the n-grams in the sequence of n-grams so that each n-gram corresponds to a different list item. Exemplary embodiments thus provide a fast, efficient, convenient and streamlined manner of creating and managing lists, and avoids the need for providing audio input for the creation of a list one list item at a time.

Exemplary embodiments also provide systems, devices and methods that allow display of representations of list items of a shopping list on a map of a store in order to facilitate a shopping trip. Exemplary embodiments provide systems, devices and methods to display a route represented on a store map that may be taken through the store to pick up the items on a shopping list during a shopping trip. A user may follow the displayed route to easily navigate through the store, visit only those store departments where the listed items are located, and to pick up all of the listed items. Exemplary embodiments thereby allow the user to save time, easily locate items that may be difficult to find in a large store, and to complete his/her shopping activities without having to locate and request assistance from store employees.

Certain terms are defined below to facilitate understanding of exemplary embodiments.

As used herein, a "list" is an ordered or unordered collection of items.

As used herein, a "list item" is an item on a list wherein each item comprises one or more words. An exemplary list item may be a general noun, concept or entity, e.g., "go to the gym," "milk," "eggs," "furniture," or a specific product item, e.g., "Dole™ Orange Juice."

As used herein, a "product item" is an actual real-world product (e.g., Dole™ orange juice products) that may correspond to a list item (e.g., orange juice).

As used herein, a "representation" of an entity on a user interface is any suitable audio-visual designation for the entity that may be viewed by a user on the interface and that may, in some embodiments, be selected and/or manipulated by the user. Exemplary representations of entities may include, but are not limited to, icons, pictures or pictograms, text, audio, a combination of the foregoing, and the like. Exemplary entities that may be represented on exemplary user interfaces include, but are not limited to, list items, actual product items corresponding to list items, stores, store departments, store locations, and the like.

As used herein, an "n-gram" is a sub-sequence of n consecutive textual items in a particular textual sequence. An n-gram of size one is referred to as a "unigram," an n-gram of size two is referred to as a "bigram" and an n-gram of size three is referred to as a "trigram," and the like.

As used herein, a "stop word" is a word, a collection of words or any other textual feature that is highly common in natural language text and that is not typically included in a list. A collection of stop words usable in accordance with exemplary embodiments may be predefined and updated by a user. Exemplary stop words may include, but are not limited to, "a," "the," and the like.

As used herein, a "pointing device" is any suitable input interface, specifically, a human interface device, that allows a user to input spatial data to a computing system or device. In an exemplary embodiment, the pointing device may allow a user to provide input to the computer using physical gestures, for example, pointing, clicking, dragging, dropping, etc. Exemplary pointing devices may include, but are not limited to, a mouse, a touchpad, a finger of the user interfacing directly with a display device, and the like.

Exemplary embodiments are described below with reference to the drawings. One of ordinary skill in the art will recognize that exemplary embodiments are not limited to the illustrative embodiments, and that components of exemplary systems, devices and methods are not limited to the illustrative embodiments described below.

I. Exemplary Embodiments Representing List Items on List Display

Exemplary embodiments provide systems, devices and methods that allow creation and management of a list of items in an integrated manner on an interactive user interface. A user may speak a plurality of list items in a natural unbroken manner to provide an audio input stream into an audio input device. Exemplary embodiments may automatically process the audio input stream to convert the stream into a text output, and may process the text output into a sequence of a plurality of n-grams. Exemplary embodiments may automatically populate a new or existing list on a user interface with the n-grams in the sequence of n-grams so that each n-gram corresponds to a different list item.

FIG. 1 is a block diagram of exemplary components of an exemplary computing device 100 that may be used to implement and perform exemplary embodiments. Exemplary computing device 100 may be one or more suitable computing device, such as a workstation, desktop computer, server, laptop, personal computer, handheld computer, tablet computer (e.g., the iPad™ tablet computer), mobile computing or communication device (e.g., the iPhone™ mobile communication device, the Android™ mobile communication device, and the like), or other form of computing or telecommunications device that is capable of communication and that has sufficient processor power and memory capacity to perform the operations described herein.

Computing device 100 may include a visual display device 102, such as a screen or monitor, that may display one or more user interfaces 104 that may be provided in accordance with exemplary embodiments. An exemplary user interface may provide and render one or more lists of items. Another exemplary user interface may provide and render one or more maps of stores and representations of list items on the maps. Alternatively, the single user interface may render one or more lists and a store map.

Computing device 100 may include an audio input device 106, such as a microphone, that may be used by a user to provide an audio input stream.

Computer device 100 may also include one or more hardware and/or software modules implemented and programmed in hardware to perform audio and language processing. An audio recording module 108 may record and save an audio input stream provided by a user at the audio input device 106. The audio input stream may be saved in any suitable file format, e.g., mp3, mp4, and the like.

An audio filtration module 110 may analyze the audio input stream and remove or reduce noise from the audio input stream to generate a filtered audio input stream. Any suitable conventional noise reduction software may be used in the audio filtration module 110, e.g., the Noise Reduction™ product from Sony Corporation.

In exemplary embodiments, the audio recording module 108 and the audio filtration module 110 may be provided separately or as a single component.

A speech recognition module 112 may analyze the filtered audio input stream to convert the stream into a textual output. Any suitable conventional speech recognition software may be used in the speech recognition module 112, e.g., Windows Speech Recognition from Microsoft Corporation. In an exemplary embodiment, the speech recognition module 112 is able to correctly recognize and process different regional accents and dialects spoken by the same or different users. The speech recognition module 112 is able, for example, to recognize the English language spoken in any number of accents, e.g., the American accent, the British accent, etc. In one example, a British speaker may pronounce the word "over" like "ova." In this example, the speech recognition module 112 is able to process the audio input stream including the sound "ova," automatically determine that the sound "ova" more correctly corresponds to the word "over," and generate textual output including the word "over" rather than the word "ova."

In an exemplary embodiment, a natural language processing module 114 may analyze the textual output to filter out stop words and/or textual features that indicate hesitation (e.g., "um," "ah," and the like) to generate a filtered textual output. Stop words are words or any other textual feature that are highly common in natural language text and that are not typically included as list items. A collection of stop words usable in accordance with exemplary embodiments may be predefined and updated by a user. Exemplary stop words may include, but are not limited to, "a," "the," and the like.

The language processing module 114 may parse the filtered textual output to generate a sequence of one or more n-grams included in the text. Each n-gram is a sequence of n words that is likely to be presented as a single unit in the textual output. For example, the language processing module 114 may determine that an exemplary textual output of "orange juice milk eggs" includes the bigram "orange juice" and the unigrams "milk" and "eggs." Any suitable conventional n-gram generator may be used in the language processing module 114. In an exemplary embodiment, the language processing module 114 may be trained in a training mode on a training set of textual outputs to learn the different n-grams that occur in the training set and the frequencies of their occurrence. Other conventional statistical models may also be used in training the language processing module 114. The trained language processing module 114 may then be used in a testing mode to analyze a raw or processed textual output from the speech recognition module 112 in order to generate one or more n-grams that are contained in the textual output.

In exemplary embodiments, the speech recognition module 112 and the natural language processing module 114 may be provided separately or as a single component.

The computing device 100 may include a product catalog database 116 that stores information mapping one or more list items that may include general concepts (e.g., breakfast food) and/or general product descriptions (e.g., orange juice) to one or more actual product items that may be purchased at a store (e.g., Dole™ orange juice products). The catalog database may be, in an exemplary embodiment, a relational database that includes entries for each actual product item (e.g., Hood™ Fat Free Milk) and includes additional information on each product item including, but not limited to, one or more corresponding list items or concepts (e.g., milk, fat free milk, breakfast, and the like), manufacturer brand, identifier size, volume, price, and the like. The catalog database may be stored on the same computing device on which a list management user interface is rendered or on a separate computing device that may be accessed by the user interface, for example, over a communication network like the Internet.

In an exemplary embodiment, one or more computing devices 120 may be provided separately and remotely from the computing device 100. In an exemplary embodiment, the product catalog database 116 and, optionally, any other relevant database may be provided on the remote computing device 120. The computing device 100 may communicate with the remote computing device 120 to receive information from the remote databases for creating and managing lists rendered on the user interface 104. In an exemplary embodiment, one or more of the audio recording module 108, the audio filtration module 110, the speech recognition module 112, and the natural language processing module 114 may be provided on the remote computing device 120 and may be accessed and used by the computing device 102 for creating and managing lists rendered on the user interface 104.

The computing device 100 may communicate with modules and/or databases on the remote computing device 120 via one or more communication devices 118. The communication devices 118 may include, but are not limited to, one or more receivers, one or more transmitters, one or more transceivers, one or more antennae, and the like. In an exemplary embodiment, the computing device 100 may communicate with the remote computing device 120 in a wireless manner using one or more wireless communication or networking protocols, e.g., Bluetooth, TCP/IP, etc.

Figure 2:
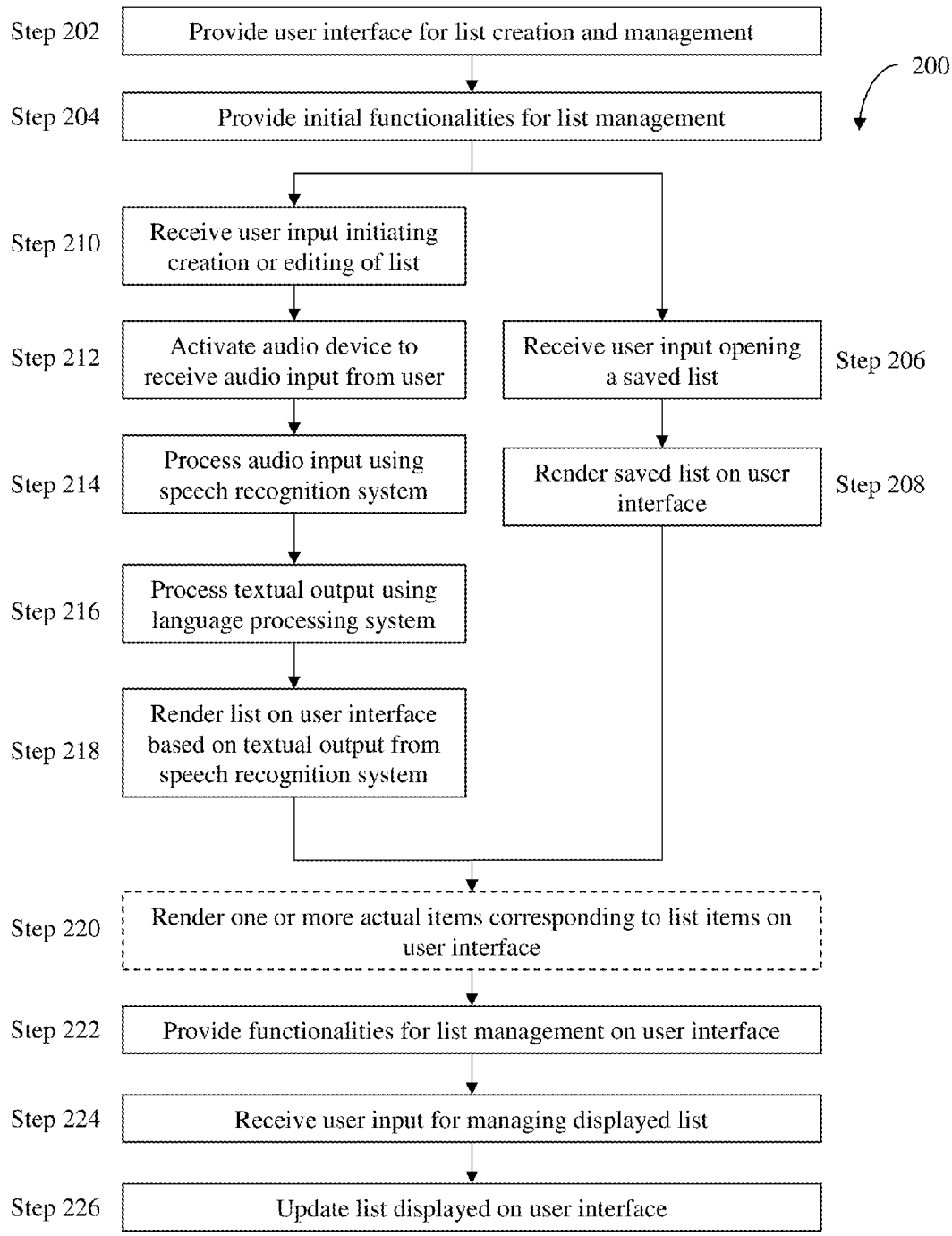
FIG. 2 is a flowchart illustrating an exemplary list management method that may be used to provide and manage one or more lists.

FIG. 2 is a flowchart illustrating an exemplary list creation and management method 200 that may be used to provide and manage one or more lists.

In step 202, one or more user interfaces may be rendered on a display device to allow a user to create and manage lists. The user interface may be interactive in that a user may select, manipulate and perform operations on one or more items rendered on the user interface. The user interface may be dynamic in that it may include movable and/or updatable components (e.g., list items) whose presence, absence or order on a list may be changed automatically or based on user input. As an example, the positional order of an item on a list may be changed by a user or automatically. As another example, an item may be added to or removed from a list based on user input or automatically.

In step 204, the user interface may provide one or more initial functionalities for list management. The user interface may provide the initial functionalities throughout the time that the user interface is in use so that the functionalities may be accessed by a user at any time. In an exemplary embodiment, the initial functionalities may include, but are not limited to, creating a new list, opening a saved list, adding one or more items to an existing list, and the like. The user interface may also provide other functionalities for setting and/or changing aspects of the general appearance of the user interface including, but not limited to, the font type, font size, font color, background picture, and the like. The initial functionalities may be represented on the user interface using any suitable representations including, but not limited to, menu items, buttons, icons, and the like.

In step 206, the user interface may receive user input for opening a saved list, for example, by selecting a "Open saved list" menu item rendered on the user interface. Alternatively, the user input may be provided separately from the user interface using, for example, an audio input device to provide a voice command (e.g., by speaking into the audio input device "open saved list").

In step 208, in response to the user input for opening a saved list, the user interface may retrieve list information stored in a relevant database and render the information in the form of a list on the user interface. The user interface may communicate with a relevant database using any suitable communication interface including, but not limited to, an application programming interface (API), one or more function calls, and the like.

In step 210, the user interface may receive user input initiation creation or editing of a list, for example, by selecting a "Create new list" menu item rendered on the user interface. Alternatively, the user input may be provided separately from the user interface using, for example, an audio input device to provide a voice command (e.g., by speaking into the audio input device "create new list").

In step 212, exemplary embodiments may receive an audio input stream from the user at one or more audio input devices. The audio input stream may include a sequence of a plurality of list items spoken by the user speaking the list items in natural unbroken manner.

In step 214, exemplary embodiments may process the audio input stream using a speech recognition system that may convert the stream into textual output. In an exemplary embodiment, noise in the audio input stream may be reduced or eliminated before the conversion to the textual output. In an exemplary embodiment, the user interface may transmit the audio input stream to the speech recognition system and may generate and transmit an instruction to instruct the speech recognition system to process the audio input stream to generate the textual output. The user interface may communicate with the speech recognition system using any suitable communication interface including, but not limited to, an application programming interface (API), one or more function calls, and the like.

In step 216, exemplary embodiments may process the textual output using a natural language processing system to generate a sequence of one or more n-grams in which each n-gram corresponds to a list item. In an exemplary embodiment, stop words and words of hesitation may be removed from the textual output before generation of the sequence of n-grams. In an exemplary embodiment, the user interface may transmit the textual output to the natural language processing system and may generate and transmit an instruction to instruct the natural language processing system to process the textual output to generate the sequence of n-grams. The user interface may communicate with the natural language processing system using any suitable communication interface including, but not limited to, an application programming interface (API), one or more function calls, and the like.

In step 218, exemplary embodiments may render a list on the user interface based on the one or more n-grams, in which each n-gram is represented as a separate list item. In an exemplary embodiment, before rendering the list, the user interface may display the n-grams for the user's acceptance, editing or rejection. The user may be allowed to accept the n-grams for representation in the form of a list, to reject the use of the n-grams to form a list, to edit the n-grams (e.g., removing one or more n-grams, adding one or more n-grams, reordering the n-grams, correcting the spelling of one or more n-grams, etc.) before a list is formed based on the n-grams, and the like. In this exemplary embodiment, upon the user accepting the original or edited sequence of n-grams, the user interface may render a new list formed based on the n-grams in which each n-gram is represented as a separate list item.

In step 220, based on the list items rendered on the user interface, representations of one or more product items may optionally be rendered on the user interface corresponding to one or more list items. In an exemplary embodiment, a list item may be analyzed and one or more actual product items that correspond to the list item may be automatically determined. An exemplary embodiment may consult a product catalog database 216 that stores information mapping one or more list items that may include general concepts (e.g., breakfast food) and/or general product descriptions (e.g., orange juice) to one or more actual product items that may be purchased at a store (e.g., Dole™ orange juice products). In an exemplary embodiment, the user may be allowed to review, edit and/or select one or more of the determined product items for rendering on the user interface. The selected actual product items may then be rendered on the user interface. The representation of the actual product item may replace the representation of the corresponding list item on the user interface or may, alternatively, be provided along with the representation of the corresponding list item on the user interface.

In one example, the user's prior selection of an actual product item may be used to determine one or more actual product items in step 220. For example, if the user has previously selected the "Gatorade Thirst Quencher Orange Sports Drink, 51 oz, $8.38" product item corresponding to the list item of "orange juice," exemplary embodiments may automatically recommend the same product item for the list item "orange juice" in the current list.

In another example, the user's prior or current selection of a favorite product item may be used to determine one or more actual product items in step 220. For example, if the user has designated the "Gatorade Thirst Quencher Orange Sports Drink, 51 oz, $8.38" product item as a favorite, exemplary embodiments may automatically recommend this product item for the list item "orange juice" in the list.

In another example, exemplary embodiments may detect wireless connectivity at the current location of the user or in the vicinity of the user using, for example, a wireless networking device. Exemplary embodiments may determine that the wireless network is associated with a store, e.g., a particular Wal-Mart store. Exemplary embodiments may then download a product catalog of the store, for example, from the Internet, using the wireless network provided by the store.

The product catalog of the store may be used to recommend or determine product items for the user's list.

In another example, a product catalog of a favorite store of the user may be used to recommend or determine product items for the user's list. In yet another example, a product catalog of a store in the vicinity of the user may be used to recommend or determine product items for the user's list.

In step 222 or concurrently with steps 208 or 218, the user interface may provide functionalities for managing the list and the items on the list rendered on the user interface. In an exemplary embodiment, the initial functionalities may include, but are not limited to, adding a new item to the list, deleting an existing item from the list, moving a list item up or down in the order of the list, merging two or more items into a single item, splitting an item into two or more items, designating an item a favorite item, designating a product item a favorite product item, and the like. The functionalities may be provided and accessed in any suitable manner including, but not limited to, menu items, voice commands, and the like.

In step 224, the user interface may receive user input at a suitable user interface device or an audio input device to indicate that the user wishes to perform a list management operation. The user may provide the input using one or more list management functionalities provided on the user interface in step 222. Exemplary user input may be related to, for example, adding a new item to the list, deleting an existing item from the list, merging two or more items into a single item, splitting an item into two or more items, designating an item a favorite item, and the like.

In step 226, the user interface may update the displayed list based on user input provided in step 224.

Figure 3:
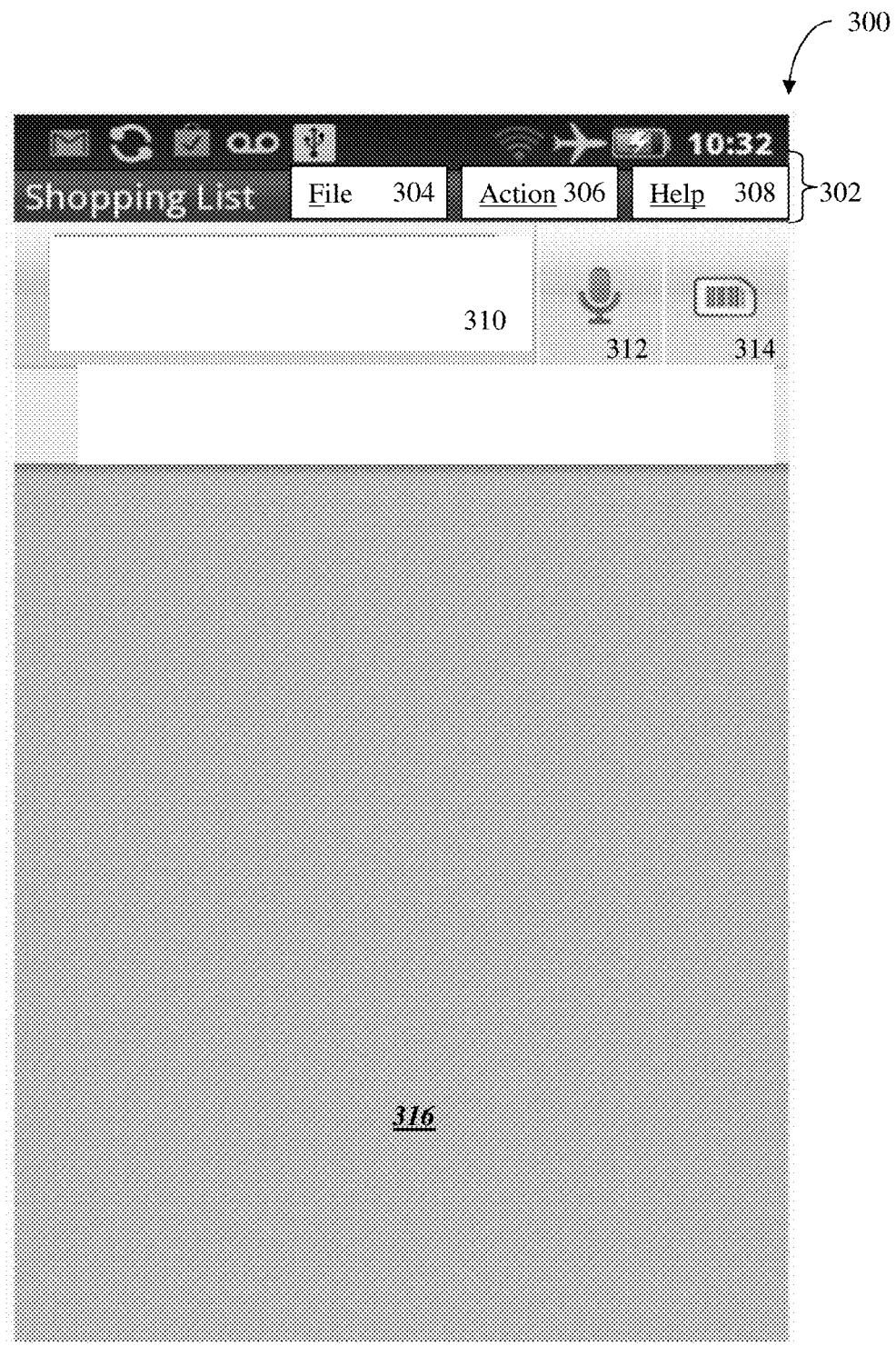
FIG. 3 illustrates an exemplary user interface that may be provided by the method of FIG. 2 to provide initial functionalities for list creation and management.

FIG. 3 illustrates an exemplary user interface 300 that may be provided by steps 202 and 204 of FIG. 2 to provide initial functionalities for list management. In an exemplary embodiment, user interface 300 may include a menu 302 of general options including, but not limited to, a "File" menu item 304 that may allow a user to create a new list, open a saved list, delete a list, print a list, exit the interface, and the like; an "Action" menu item 306 that may allow a user to perform one or more actions related to a list; and a "Help" menu item 308 that may provide information on using the interface. In an exemplary embodiment, the menu items may be accessed directly on the user interface 300 using, for example, a pointing device. In an exemplary embodiment, the menu items may also be accessed using voice commands.

In an exemplary embodiment, the menu 302 may be displayed on the user interface at all times even as the user interface is updated or changed. In an exemplary embodiment, the "Action" menu item 306 may not be provided or may be deactivated when the user interface is initially rendered. The "Action" menu item 306 may be provided or activated when the user creates or opens a list on the user interface so that actions may be performed on the list.

Figure 5:
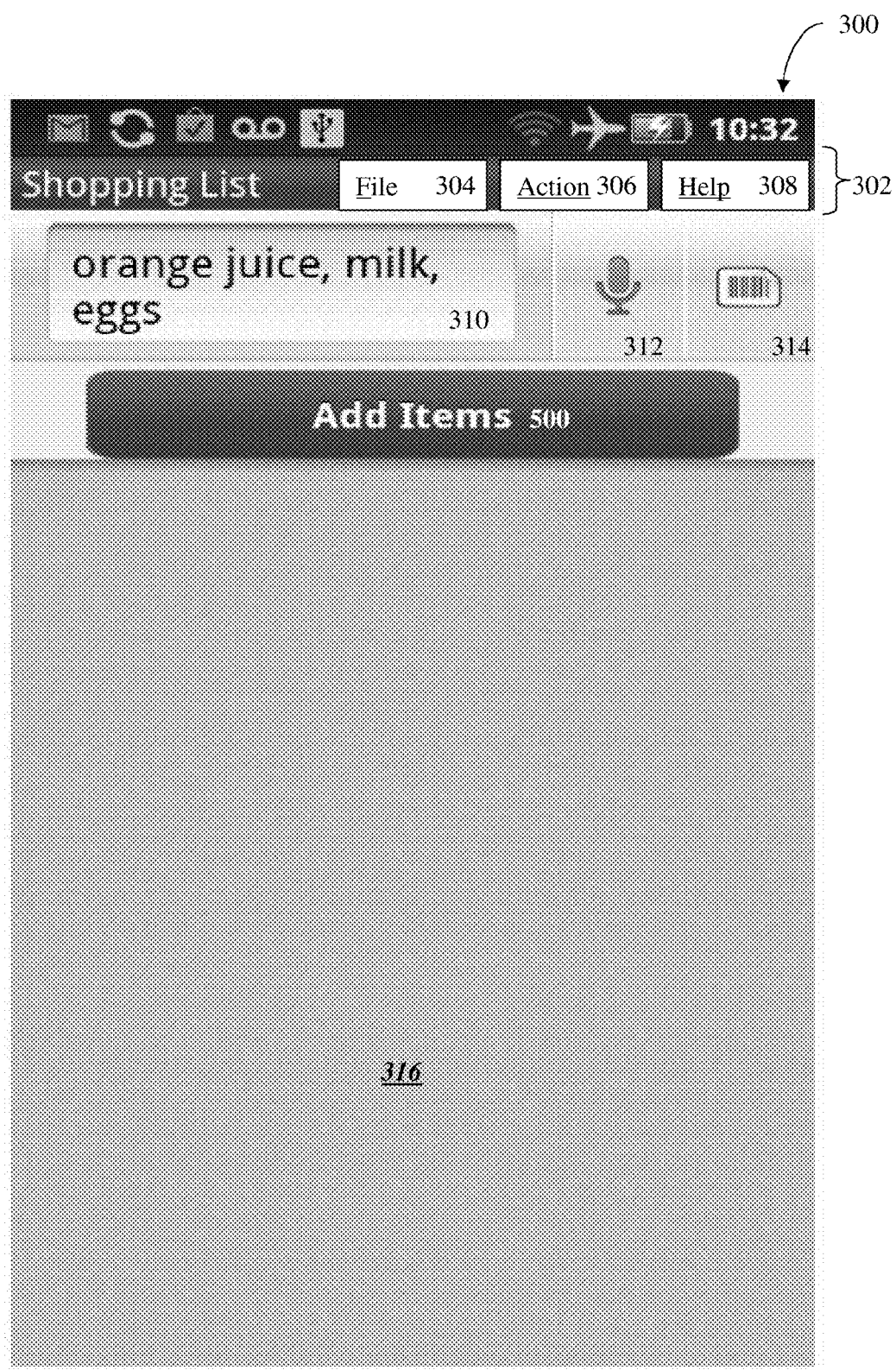
FIG. 5 illustrates an exemplary user interface on which a text display panel displays a sequence of n-grams ("orange juice, milk, eggs") for a user's review.

In an exemplary embodiment, interface 300 may include a text display panel 310. In an exemplary embodiment, the text display panel 310 may be a text field that may be used by a user to enter text, for example, the items on a list. In an exemplary embodiment, the text display panel 310 may be a text display panel that may provide textual instructions or directions to the user during the creation and/or management of a list. In one example, when the user initiates creation of a new list, the text display panel 310 may display text instructing the user to enter the list items, for example, "type, speak, scan." In another example, when the user enters audio input to indicate list items for a new or existing list, the text display panel 310 may display the list items as determined based on processing of the audio input, for example, "orange juice, milk, eggs," as illustrated in FIG. 5. FIG. 5 illustrates the exemplary user interface 300 of FIG. 3 on which the text display panel 310 displays a sequence of n-grams ("orange juice, milk, eggs") determined based on the user's audio input. The user may review the sequence rendered on the text display panel 310 before using the sequence to generate a list.

In an exemplary embodiment, interface 300 may include an audio input button 312 that may be selected by a user to indicate that the user wishes to enter a list using audio input and/or to perform an action using a voice command. In an exemplary embodiment, upon selection of the audio input button 312, exemplary embodiments may receive an audio input stream at an audio input device of the computing device. The audio input device may allow the user to directly speak into the computing device to create a list or to perform a list action. Upon selection of the audio input button 312, exemplary embodiments may also record and store the audio input stream using an audio recording module.

In an exemplary embodiment, interface 300 may include a catalog option 314 that may be selected by a user to look up one or more actual product items corresponding to one or more list items. For example, for a list item that generically indicates "milk," the catalog option 314 may be selected to display, for example, the actual product items "Hood™ Fat Free Milk," "Hood™ 1% Lowfat Milk," "Hood™ 2% Reduced Fat Milk," "Hood™ Milk Vitamins C&D," and the like. Upon selection of the catalog option 314, exemplary embodiments may look up the selected list item in a catalog database and determine corresponding actual product items. Exemplary embodiments may then render representations of the actual product items on the interface 300 so that the user is allowed to select, for each selected list item, one or more actual product items. In an exemplary embodiment, the user may select one or more list items on a displayed list, and then select the catalog option 314 to determine actual product items for the selected list items. In another exemplary embodiment, the user may select the catalog option 314 to determine actual product items for all of the list items on the displayed list.

In an exemplary embodiment, interface 300 may include a list display panel 316 on which one or more lists may be provided and rendered. In an exemplary embodiment in which multiple lists are provided, separate tabs may be provided for the lists so that the user may access all of the lists using the selectable tabs.

In an exemplary embodiment, as illustrated in step 206 of FIG. 2, the user may select an "open saved list" option under the "File" menu item 304, and may select a particular saved list presented to the user. The saved lists may be stored on a suitable database. In response to the user's selection of a saved list, as illustrated in step 208 of FIG. 2, exemplary embodiments may render the saved list on the list display panel 316 of the user interface 300.

In another exemplary embodiment, as illustrated in step 210 of FIG. 2, the user may select a "create list" option under the "File" menu item 304 and may subsequently select the audio input button 312 to indicate that the list items will be entered by audio input. In another exemplary embodiment, the user may directly select the audio input button 312 to indicate both the creation of a new list and to indicate that the list items will be entered by audio input.

In response to the user's selection to create a new list by audio input, exemplary embodiments may allow the user to provide textual input to specify one or more list items for the new list. For example, exemplary embodiments may provide a text input panel or box on the user interface.

Figure 4:
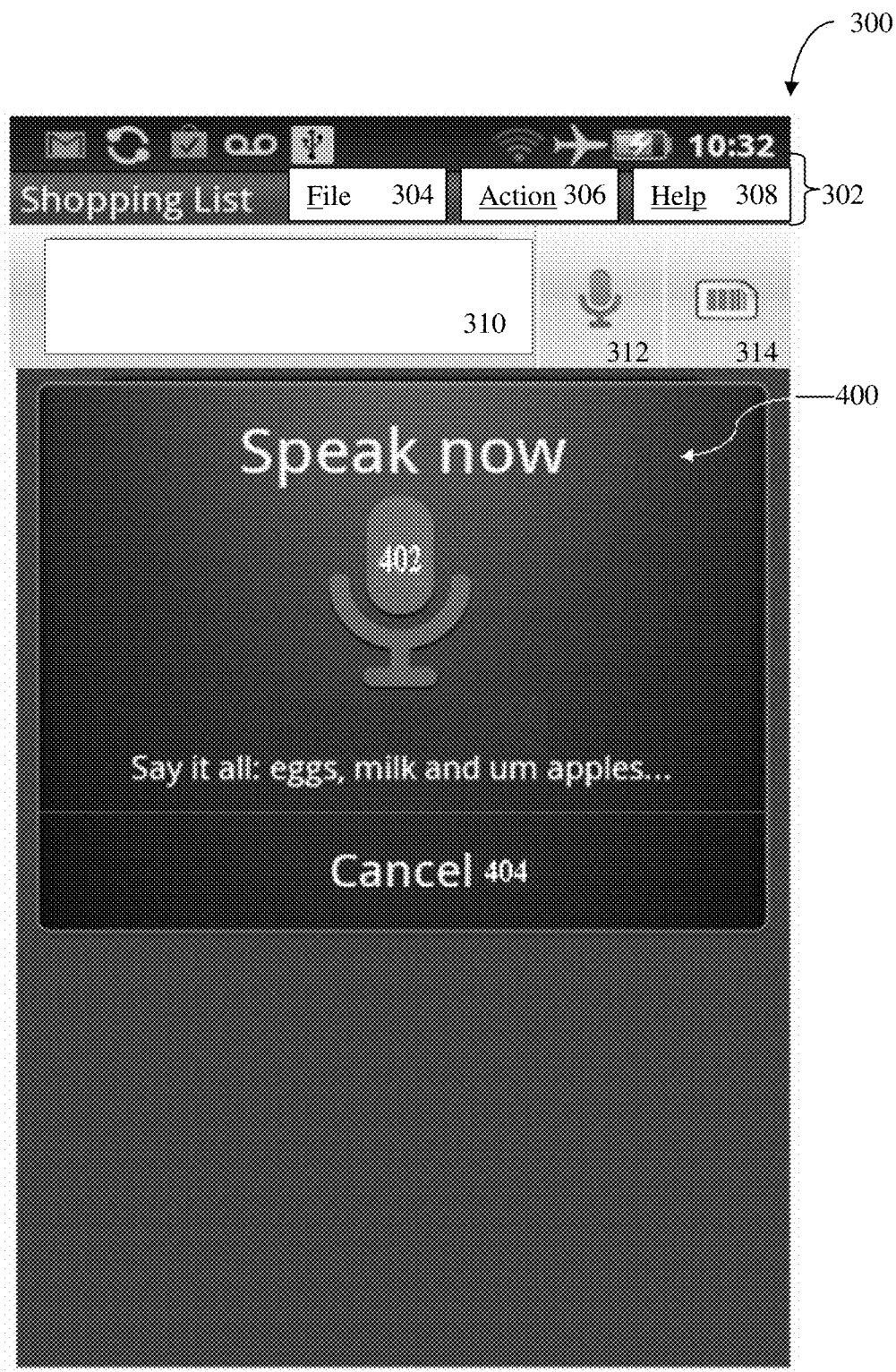
FIG. 4 illustrates an exemplary user interface on which a graphical display is overlaid on the interface to instruct a user to input an audio input for adding one or more items to a new or existing list.

Alternatively, exemplary embodiments may allow the use to provide audio input by speaking, in a natural manner, an unbroken sequence of a plurality of list items for the new list. An exemplary embodiment may receive an audio input stream from the user using an audio input device. An exemplary embodiment may also record the audio input stream using an audio recording device or module. Exemplary embodiments may concurrently render an exemplary user interface as illustrated in FIG. 4 on the display device to provide instructions to the user. FIG. 4 illustrates the exemplary user interface 300 of FIG. 3 on which a graphical display is overlaid on the interface to instruct the user to input an audio input. In an exemplary embodiment, the user interface 300 may provide a graphical display 400 that covers most or the entirety of the interface 800 and instructs the user to speak the list items. In the example illustrated in FIG. 4, the display 400 may display a pictogram of a microphone 402 and may include text stating, for example, "Speak now .... Say it all: eggs, milk and um apples ...." The display 400 may include a "Cancel" option 404 that allows the user to cancel the creation of a new list. In an exemplary embodiment, the display 802 may overlap and deactivate the text panel 310, the audio input button 312 and the catalog option 314 during the time that the user is providing audio input.

In one example, the user may speak in an unbroken natural manner three list items "orange juice," "milk" and "eggs" that form a single audio input stream An exemplary audio filtration module 110 may reduce or remove noise from the audio input stream to generate a filtered audio input stream. An exemplary speech recognition module 112 may analyze the filtered audio input stream to generate a textual output that includes a sequence of words. An exemplary language processing module 114 may analyze the textual output to remove stop words and words of hesitate, and may generate a sequence of n-grams in which each n-gram corresponds to a list item.

In an exemplary embodiment, a list may be generated and rendered on the list display panel 316 automatically after the sequence of n-grams is generated. In another exemplary embodiment, the user may be allowed to review the sequence of n-grams and to approve, reject or edit the sequence before a list is rendered on the list display panel 316. In this embodiment, the sequence of n-grams may be rendered in the text panel 310. FIG. 5 illustrates the exemplary user interface 300 of FIG. 3 in which the text display panel 310 displays a sequence of n-grams ("orange juice, milk, eggs") determined based on the user's audio input. In another exemplary embodiment, the text panel 310 may be used by the user to enter text and may also be used to provide textual instructions or directions to the user. If the user approves of the sequence of n-grams (i.e., agrees that each n-gram correctly corresponds to a list item), the user may select an "Add Items" option 500 to generate and render a list in the list display panel 316 based on the displayed sequence of n-grams.

Figure 6:
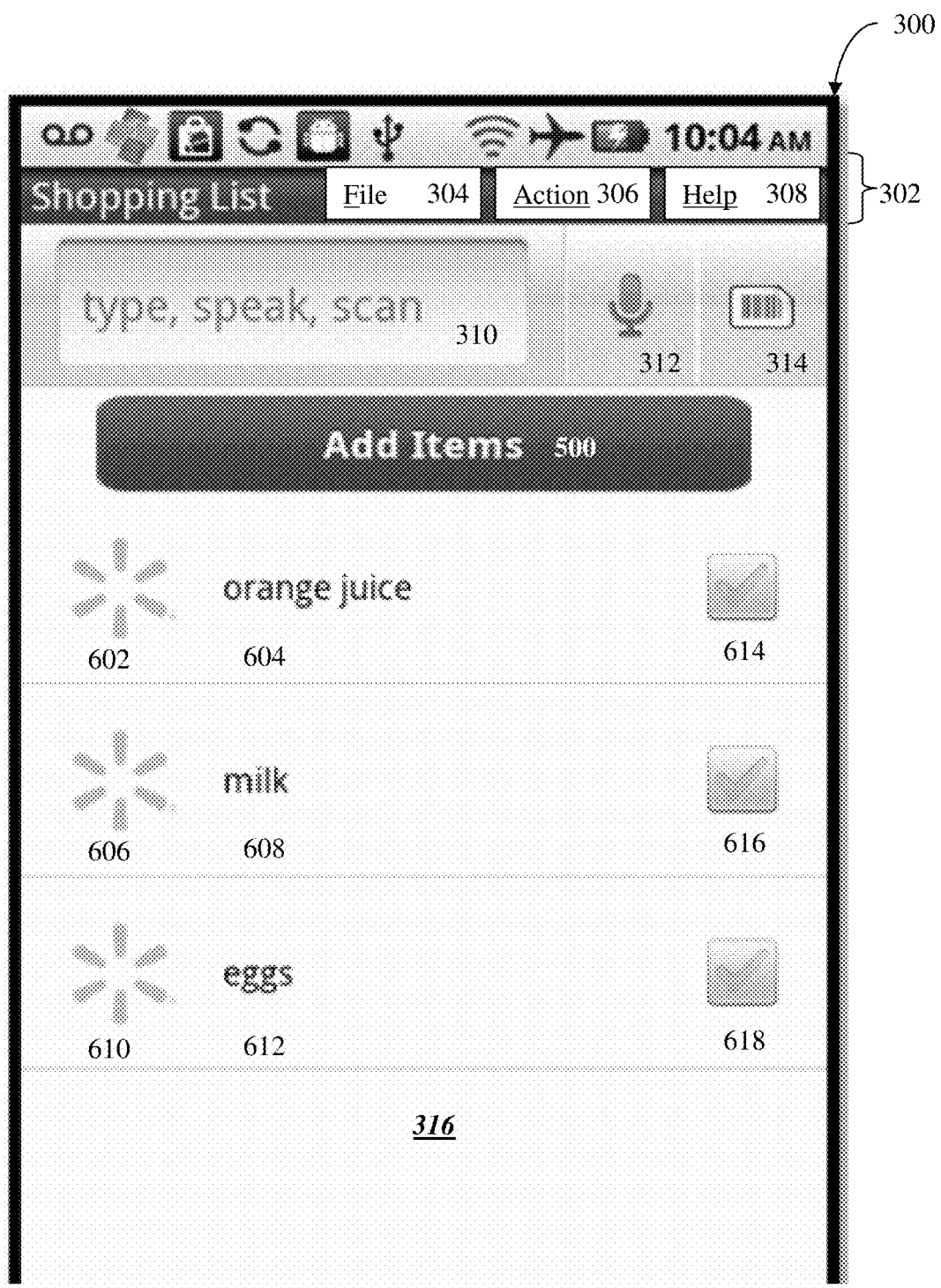
FIG. 6 illustrates an exemplary list provided and rendered on a list display panel of an exemplary user interface.

FIG. 6 illustrates an exemplary list provided and rendered on the list display panel 316 of the exemplary user interface 300 of FIG. 3. The list may be a newly created list or may be a saved list. The exemplary list may include three list items represented on the list display panel 316: an "orange juice" item represented by a list item symbol 602 and a textual description 604, a "milk" item represented by a list item symbol 606 and a textual description 608, and an "eggs" item represented by a list item symbol 610 and a textual description 612. Each list item may be associated with a selection option that allows the user to select each of the list items or to collectively select all of the list items. For example, the "orange juice," "milk" and "eggs" items may be associated with check-boxes 614, 616 and 618, respectively, that may be selected individually. Upon selection one or more list items, the user may perform one or more actions on the list items.

Exemplary embodiments may automatically recommend or render one or more actual product items corresponding to one or more list items input by the user. Exemplary embodiments may retrieve the actual product items in a product catalog database corresponding to the list items. In an exemplary embodiment, the user's prior selections of actual product items may be used to determine one or more actual product items to recommend for the current list. For example, if the user has previously selected the "Gatorade Thirst Quencher Orange Sports Drink, 51 oz, $8.38" product item corresponding to the list item of "orange juice," exemplary embodiments may automatically recommend the same product item for a list item of "orange juice" in the current list.

Figure 7:
FIG. 7 illustrates an exemplary user interface that may be provided by the method of FIG. 2 on which a list item added by a user is replaced by a representation of an actual product item.

FIG. 7 illustrates the exemplary user interface 600 of FIG. 6 that may be provided by step 220 of FIG. 2, on which the "orange juice" list item 602 input by the user is replaced by a pictorial representation 702 and a textual representation 704 of an actual product item "Gatorade Thirst Quencher Orange Sports Drink, 51 oz, $8.38" corresponding to the list item 602. In an exemplary embodiment, an actual product item may replace a corresponding list item on the user interface. In another exemplary embodiment, an actual product item may be provided along with a corresponding list item on the user interface.

Figure 8:
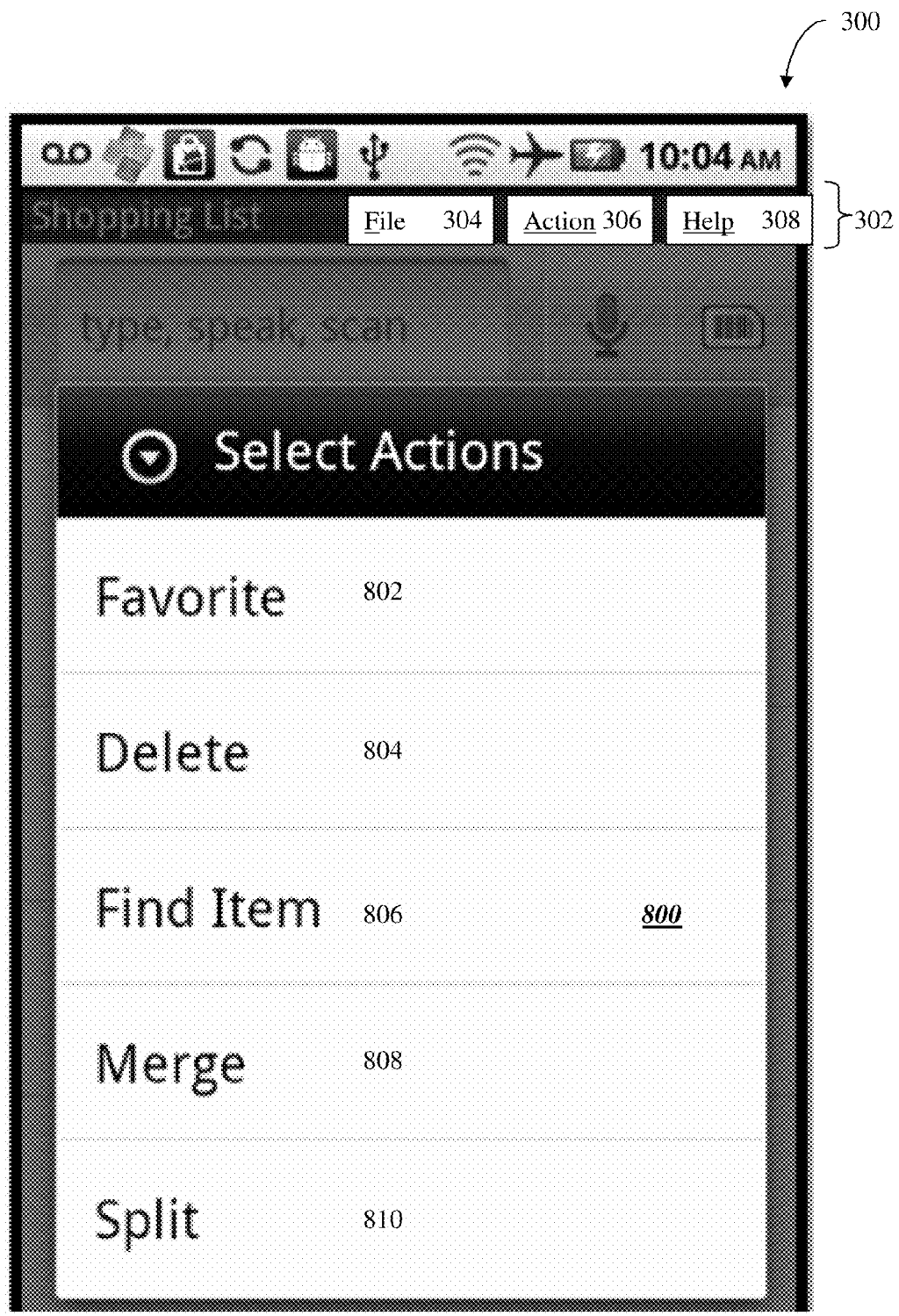
FIG. 8 illustrates an exemplary user interface that may be provided by the method of FIG. 2 on which one or more list management options are rendered.

FIG. 8 illustrates an exemplary user interface that may be provided by step 222 of FIG. 2, on which one or more list management options 800 are rendered. A user may use the options to perform one or more actions on the list as a whole or on specific list items. Exemplary list management options may be presented and accessed in any suitable way including, but not limited to, menu items, voice commands, and the like.

The list management options 800 may include a "Favorite" option 802 that allows a user to select one or more list items and to designate the list items as the user's favorite items. In an exemplary embodiment, the favorite list items may be saved on a storage device and may be automatically loaded into another list.

Figure 9:
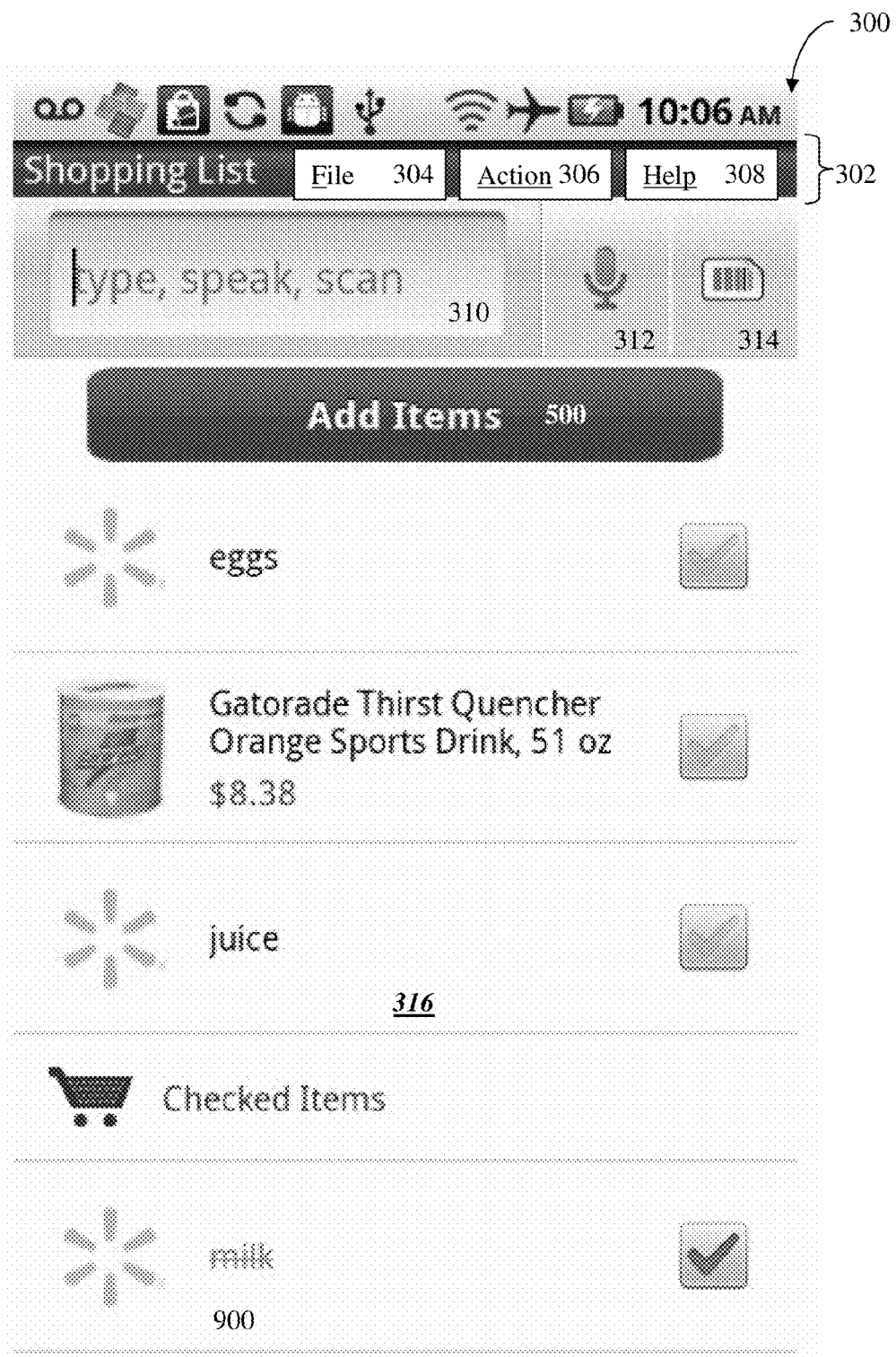
FIG. 9 illustrates an exemplary user interface on which a list item is indicated as being checked out or already purchased.

The list management options 800 may include a "Delete" option 804 that allows a user to select one or more list items and to remove the list items from the user interface. In response, exemplary embodiments may remove the rendering of the selected list items from the user interface. In another exemplary embodiment, the rendering of the selected list items may be changed, without removal, on the user interface (e.g., may be shown as crossed off or may be indicated as being checked out). FIG. 9 illustrates the exemplary user interface 300 of FIG. 3 on which a "milk" list item 900 is indicated as being checked out or already purchased, for example, by being crossed off and by appearing under a "Checked Items" icon and text.

The list management options 800 may include a "Find Item" option 806 that allows a user to search for one or more list items on the user interface, which may facilitate finding an item in a long list.

The list management options 800 may include a "Merge" option 808 that allows the user to select two or more list items rendered on the user interface and to merge the items into a single list item. For example, the user may merge the list items "orange" and "juice" to form a merged list item "orange juice." In response, exemplary embodiments may remove the rendering of the two or more selected list items from the user interface, form a new merged list item by concatenating the two or more selected list items, and include the rendering of the new merged list item on the user interface.

The list management options 800 may include a "Split" option 810 that allows a user to select a list item rendered on the user interface and to split the item into two or more list items. For example, the user may split up the list item "orange juice" to form the list items "orange" and "juice." In an exemplary embodiment, the selected list item may be split automatically based on n-gram analysis to determine a natural splitting location in the list item. In another exemplary embodiment, the selected list item may be split based on user input on how to split up the item. In response, exemplary embodiments may remove the rendering of the selected list item from the user interface, form two or more split list items, and include the rendering of the new split list items on the user interface.

II. Exemplary Embodiments Representing List Items on Map Display

Exemplary embodiments may facilitate shopping for the items on a shopping list by providing a spatial map of a store at which the items may be purchased. Exemplary embodiments may render the map of the store on a user interface on the user's display device. In an exemplary embodiment, the items on the shopping list may be represented in the rendering of the store map, for example, at locations on the map at which the items are available. For example, the list item "milk" may be represented at a location on the map representing the dairy section of a grocery store.

Exemplary embodiments may also provide directions or instructions to a user on locating the shopping list items directly on the rendering of the map. Exemplary embodiments may render a route on the map to connect an entrance to the store, an exit of the store, and one or more location representations on the map at which the list items are available (e.g., the dairy section), and the like. In an exemplary embodiment, the route rendered on the map may be an optimal path that minimizes the amount of distance that needs to be covered in order to pick up all of the items on the shopping list. Exemplary embodiments may render written directions on the map or on a separate user interface to guide the user through the store in order to pick up the items on the shopping list. Exemplary embodiments may provide audio directions to guide the user through the store in order to pick up the items on the shopping list.

Figure 10:
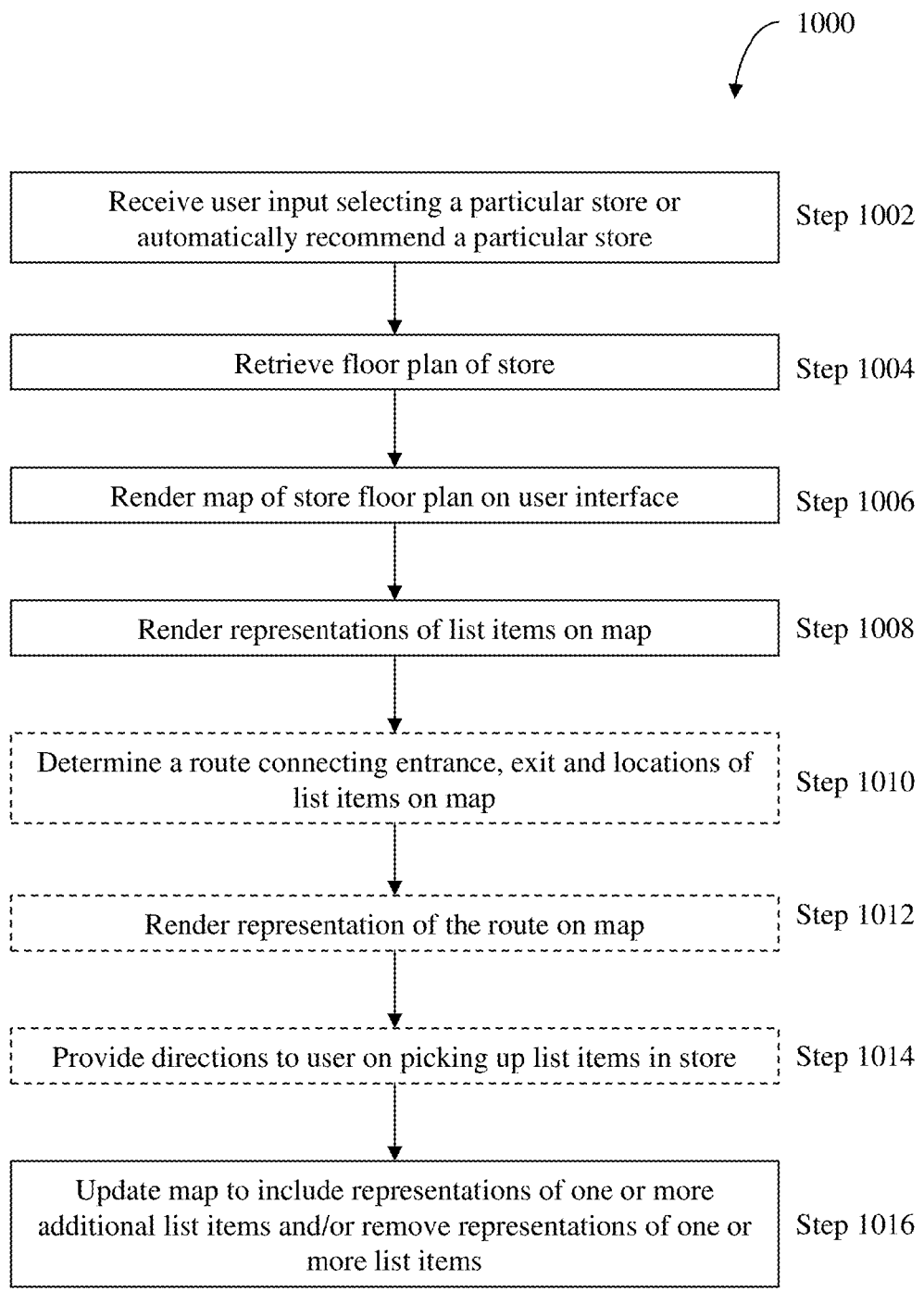
FIG. 10 is a flowchart illustrating an exemplary method for providing a graphical user interface rendering a store map to facilitate a shopping trip of a user.

FIG. 10 is a flowchart illustrating an exemplary method 1000 for providing a store map to facilitate a shopping trip of a user.

In step 1002, exemplary embodiments may receive a selection of a particular store at which the user wishes to purchase the items on a shopping list. The user may select the particular store using any suitable textual and/or audio input, for example, by indicating the geographical location of the store, the brand name and general location of the store, and the like. In an exemplary embodiment, the user may select the particular store from a saved list of stores, for example, stores that are frequented by the user. Upon the user's selection of a particular store, exemplary embodiments may save the selection in a suitable database for providing future recommendations on stores. Exemplary embodiments may also save information associated with the selected store including, but not limited to, the date and time of the shopping trip, the geographical location of the user when the store selection was made, the shopping list items associated with the store selection, and the like.

Alternatively, in step 1002, exemplary embodiments may automatically recommend one or more suitable stores for the user's shopping trip. Exemplary embodiments may interface with a database and/or an online map, e.g., the Google™ Map product, in order to retrieve information on stores based on the proximity of the stores to the user and/or the computing device implementing exemplary embodiments. In making the recommendation, exemplary embodiments may analyze one or more factors associated with the user and/or the shopping list of interest including, but not limited to, one or more items on the shopping list, the current geographical location of the user as determined by a global positioning system (GPS) device and/or a geographical information system (GIS), stores previously visited by the user.

In one example, exemplary embodiments may associate the user's identity with a favorite store of the user and may recommend the favorite store for the particular shopping trip. In another example, exemplary embodiments may analyze the types of list items to determine a type of store that is likely to carry the list items, for example, a hardware store may be recommended if the shopping list includes a portable generator. Exemplary embodiments may store mappings between different types of list items (e.g., hardware items, grocery items, clothing items) and associated stores (e.g., a particular Wal-Mart location, a hardware store named "Mike's," and the like).

In another example, exemplary embodiments may use the current geographical location of the user as determined by a global positioning system (GPS) device and/or a geographical information system (GIS) to recommend one or more stores in the vicinity of the user. Exemplary embodiments may represent the stores on a geographical map and may, optionally, provide directions on reaching the stores.

In another example, exemplary embodiments may detect wireless connectivity at the current location of the user or in the vicinity of the user using, for example, a wireless networking device. Exemplary embodiments may determine that the wireless network is associated with a store, e.g., a particular Wal-Mart store, and may use the identification of that store as the recommended store for the user's shopping trip. Exemplary embodiments may also download a map of the store, for example, from the Internet, using the wireless network provided by the store.

In an exemplary embodiment, the user may review one or more stores automatically recommended by exemplary embodiments and, optionally, associated store information (e.g., distance from the user's current geographical location, the departments available at the store, whether the store is handicap-accessible, and the like). The user may then a particular store for his/her shopping trip.

In an exemplary embodiment, the rendering of a map on the user interface may be automatically changed based, for example, on the user's geographical location as determined by a global positioning system (GPS) device and/or a geographical information system (GIS). In one example, if the user is determined to have moved from a first floor of the store to a second floor, a map of the first floor displayed on the user interface may be changed to a map of the second floor. In another example, if the user is determined to have moved so that the store in closes proximity to the user has also changed (e.g., the user has moved from a location in which the closest store was store M to a location in which the closes store is store N), a map of store M on the user interface may be changed to a map of store N.

In step 1004, upon selection of a particular store for the shopping trip, exemplary embodiments may automatically retrieve the floor plans or layouts of the store that indicate where in the store the user's shopping list items may be located. Exemplary embodiments may interface with a database or map of the store, for example, over the Internet, in order to retrieve information on the floor plans or layouts of the store.

In step 1006, exemplary embodiments may automatically render a dynamic and interactive map of the floor plans or layouts of the store on a user interface on a display device. The map may be dynamic in that it may include movable and/or moving components (e.g., representations of list items that may be newly included on the map or that may be removed from the map once the user purchases the items). The map may be interactive in that the user may select, manipulate and perform operations on components rendered on the map using, for example, a pointing device. A user may also perform other functions on the map including, but not limited to, zooming in, zooming out, panning to a different region on the map, and the like. The area of the store represented on the map may be of any suitable granularity, for example, a multi-floor store (in a 3-D representation), an entire floor (in a 2-D representation), a portion of a floor, a particular department of the store (e.g., the meat department), and the like. Exemplary embodiments may allow the user to change the granularity of the map in a dynamic manner. In an exemplary embodiment, different areas of the store may be represented on different user interfaces or different panels of the user interface, all of which may be accessible to the user. The map may include any suitable information on the store, for example, the address of the store, the area of the store, the weather conditions at the store location, and the like.

In step 1008, exemplary embodiments may automatically render representations of zero, one or more shopping list items (e.g., icons representing the list items) on the user interface to populate the map. In an exemplary embodiment, all shopping list items located within the scope of the map are represented on the user interface. In an exemplary embodiment, the map may be refreshed at time intervals, in real time and/or by a user prompt in order to update the representations of the list items on the map. The user interface may include any suitable information on the list items represented on the map including, but not limited to, brand name, size, volume, type, description of the item, a rating of the item, a review of the item, and the like. The information may be presented on the user interface using any suitable technique, for example, in a text box, as different icon types (e.g., an icon of a milk carton to represent the list item "milk" or the list item "Hood™ Low Fat Milk," an icon of a tray of eggs to represent the list item "eggs," and the like), as different colored icons (e.g., red for high priority list items that the user needs to purchase immediately, green for low priority list items that the user may postpone purchasing), and the like. The user interface may allow selection and manipulation of representations of one or more list items directly on the map or in a separate component of the user interface, e.g., in a text box or selection panel.

In step 1010, optionally, exemplary embodiments may automatically determine a route that may be taken by the user through the store to pick up the list items on the user's shopping list. In an exemplary embodiment, the route may be rendered on the map to connect the representation of an entrance to the store, representations of the list items and the representation of an exit of the store. In an exemplary embodiment, the route may be optimized so that the distance traveled by the user in the store in order to pick up all of the list items is minimized. For example, exemplary embodiments may determine different routes through the store and, for each route, may determine the total distance covered by the route. In this example, exemplary embodiments may select the shorted route to recommend to the user.

In step 1012, optionally, exemplary embodiments may automatically render a route on the store map. In an exemplary embodiment, the route may be rendered as a representation of a path (e.g., one or more continuous or discontinuous lines or arrows) connecting the representation of an entrance to the store, representations of the list items and the representation of an exit of the store. The representation of the path may include arrows to direct the user to move through the store to pick up the items on his/her shopping list.

In step 1014, optionally, exemplary embodiments may provide additional directions to the user in guiding the user through the store. In an exemplary embodiment, relevant portions of the representation of the route on the map may be accompanied by textual directions, for example, "Walk right at the entrance to reach the Dairy department." In an exemplary embodiment, audio directions may be provided to the user as the moves through the store.

Exemplary embodiments may provide a "Remove" option associated with the map to allow the user to remove one or more list item representations from the map. Upon picking up and/or purchasing one or more list items, the user may select representations of the list items on the map using the "Remove" option to remove them from the map. Similarly, exemplary embodiments may provide an "Add" option associated with the map to allow the user to add one or more additional items to the map. The user may enter one or more additional list items that were left off from the shopping list in the form of audio or textual input using the "Add" option for representation of the additional list items on the map.

In step 1016, exemplary embodiments may automatically update the store map to include representations of any additional list items and/or to remove representations of one or more list items, as selected by the user. Exemplary embodiments may also reconcile the shopping list (for example, represented on a different panel of the user interface or on a separate user interface from the map) with the list items represented on the map. For example, when representations of one or more additional items are added on the map, the items may also be added to the shopping list as list items. Similarly, when representations of one or more items are removed from the map, the items may be removed from the shopping list or may be displayed differently from the other list items (e.g., the removed items may be crossed off or may be indicated as checked items).

Figure 11:
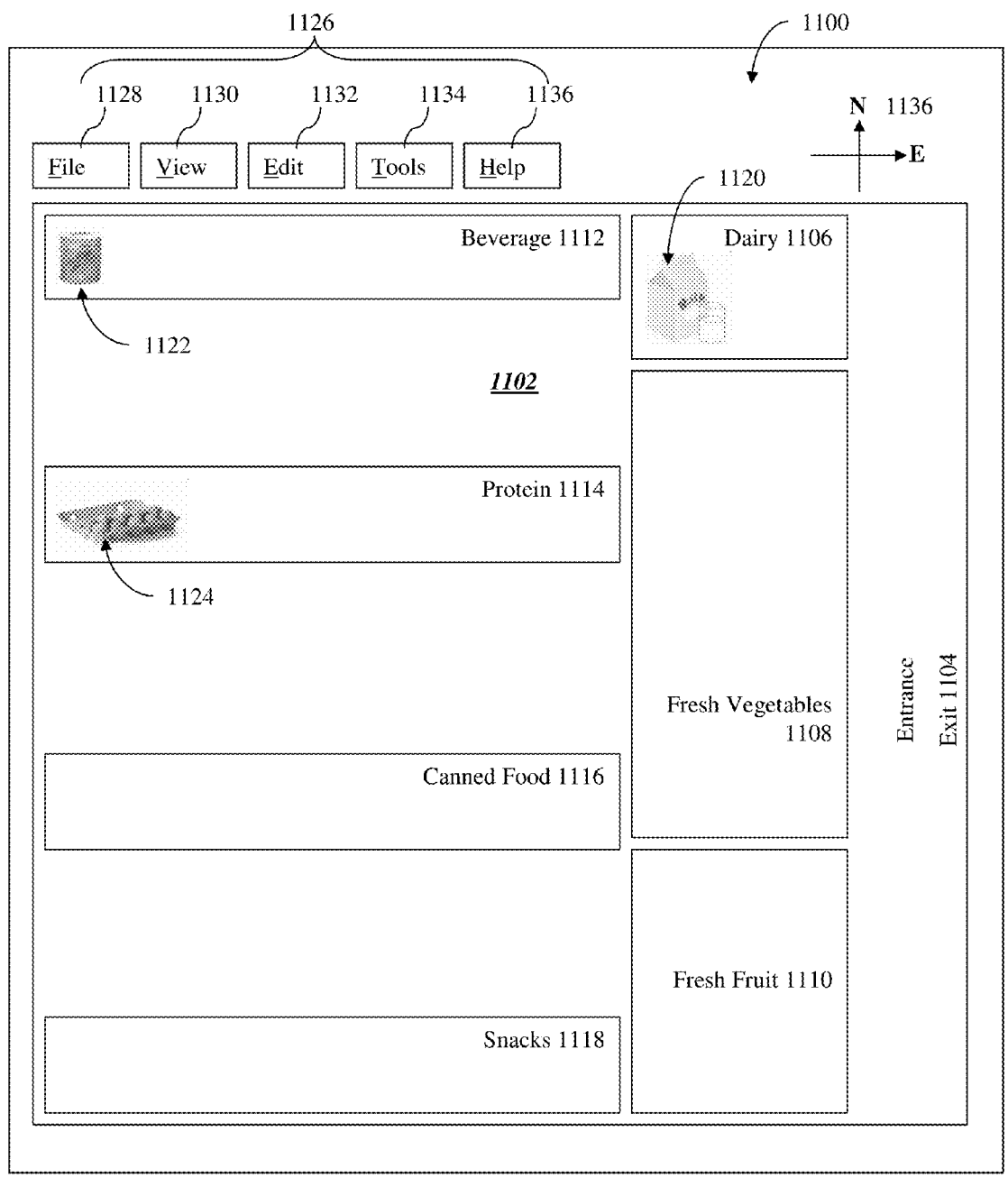
FIG. 11 illustrates an exemplary graphical user interface that may be provided using the exemplary method of FIG. 10 and that may be used to facilitate a shopping trip.

FIG. 11 illustrates an exemplary graphical user interface 1100 that may be provided using method 1000 of FIG. 10 and that may be used to facilitate a shopping trip. The user interface 1100 may render a map 1102 of the floor plan or layout of a store. In exemplary embodiments, the user interface 1100 may be displayed on a separate panel of an interface displaying the shopping list, or as a separate user interface than an interface displaying the shopping list.

In an exemplary embodiment, the user interface 1100 may represent one or more different locations and/or departments in the store, for example, an entrance/exit 1104 of the store, a Dairy department 1106, a Fresh Vegetable department 1108, a Fresh Fruit department 1110, a Beverage department 1112, a Protein department 1114, a Canned Food department 1116, a Snacks department 1118, and the like. The representations may be configured on the map 1102 in an identical or similar manner as the actual departments are location in the actual store. The user interface 1100 may also indicate compass directions 1136 associated with the map 1102. In an exemplary embodiment, the user interface 1100 may also represent locations (e.g., surrounding streets or landmarks) in the vicinity of the store to orient the user as to the entrance and exit of the store.

In an exemplary embodiment, the user interface 1100 may be populated with dynamically updatable representations of zero, one or more shopping items, for example, milk 1120, orange juice 1122 and eggs 1124. The list items may be represented on the map using any suitable audio-visual component including, but not limited to, text, icons, small pictures, and the like. The list items may be represented at locations and/or departments of the stores at which the items may be located. For example, the item milk 1120 may be represented in the Dairy department 1106, the item orange juice 1122 may be represented in the Beverage department 1112, and the list item eggs 1124 may be represented in the Protein department 1114.

Exemplary embodiments may allow the user to search for representations of one or more particular items on the map using one or more characteristics of the items as the search criteria. Exemplary search criteria may include, but are not limited to, bar codes, descriptive information, brand name, and the like. Exemplary may allow the user to search for representations of one or more locations and/or departments on the map using one or more characteristics of the locations as the search criteria.

In an exemplary embodiment, the user interface 1100 may include menu 1126 of general options including, but not limited to, a "File" menu item 1128 that may allow the user to print the map, save the map, exit the interface, and the like; a "View" menu item 1130 that may allow the user to view a route to follow through the store during the shopping trip; an "Edit" menu item 1132 that may allow the user to add one or more additional items on the map (using, for example, an "Add" menu sub-item), remove one or more items from the map (using, for example, a "Remove" menu sub-item, reconcile the representations on the map with list items on a user interface; a "Tools" menu item 1134 that may allow the user to configure other options relevant to the interface (e.g., select the databases that may be accessed to populate the user interface); and a "Help" menu item 1136 that may provide information on using the interface.

Figure 12:
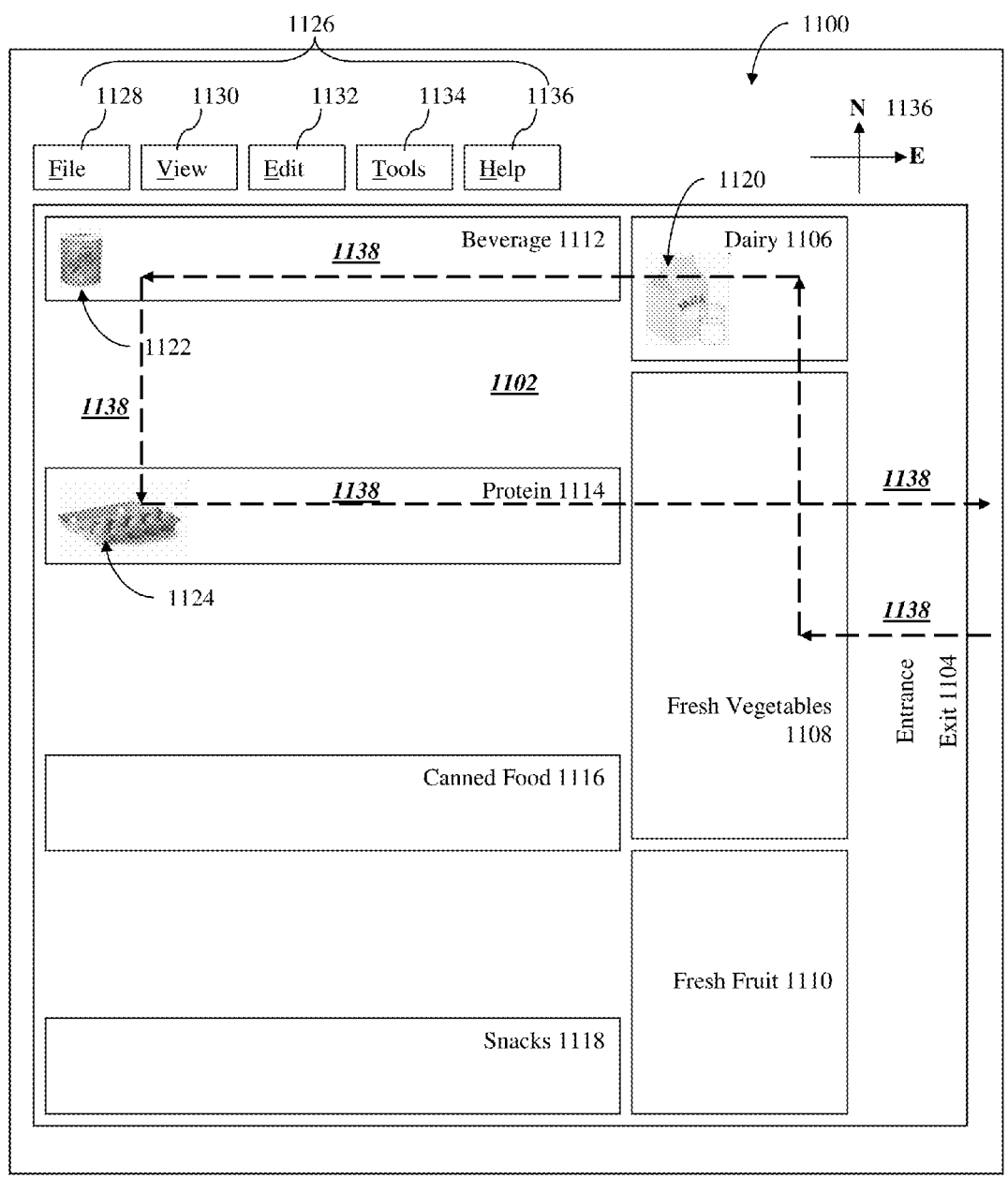
FIG. 12 illustrates the exemplary user interface of FIG. 11 that includes a representation of a route through the store map that may be taken by a user to purchase items on a list.

FIG. 12 illustrates the exemplary graphical user interface 1100 of FIG. 11 that may be automatically updated by exemplary embodiments to provide a representation of a route 1138 that may be taken by the user to purchase all of the items represented on the map. For example, the route 1138 may visually connect, in order, the entrance representation 1104, the milk representation 1120, the orange juice representation 1122, the egg representation 1124, and the exit representation 1104. The user may follow the displayed route to easily navigate through the store, visit only those departments where his/her desired items are located, and to pick up all of his/her desired items. Exemplary embodiments thereby allow the user to save time, easily locate items that may be difficult to find in a large store, and to complete his/her shopping activities without having to locate and request assistance from store employees. For example, the user may save time by avoiding the Canned Food department, the Snacks department and the Fresh Fruit department as none of the items on his/her shopping list may be found in those departments.

One of ordinary skill in the art will recognize that exemplary interface 1100 is provided for illustrative purposes and that other suitable interfaces may include textual interfaces or other graphical interfaces including more or fewer components than those illustrated in FIGS. 11 and 12.

III. Exemplary Object-Oriented Implementations

Exemplary embodiments may be implemented in any suitable object-oriented programming language, e.g., Java. In an exemplary object-oriented implementation, classes may be defined for different types of entities provided and rendered on a user interface in accordance with exemplary embodiments.

In an exemplary embodiment, a general "List Item" class may be provided to define items of a list, e.g., a shopping list, a to-do list, and the like. In exemplary embodiments, separate classes may be provided to define different list items, for example, a specific "Orange Juice" class may be provided to define an orange juice product item (e.g., Tropicana™ orange juice), a specific "Eggs" class may be provided to define an egg product item, and the like.

In an exemplary embodiment, a general "Store" class may be provided to define stores. In exemplary embodiments, separate classes may be provided to define different types of stores, for example, a specific "Wal-Mart Store" class may be provided to define Wal-Mart stores, a "Hardware Store" class may be provided to define hardware stores, and the like. In exemplary embodiments, separate classes may be provided to define different departments and/or locations of a store, for example, a "Dairy Department" class may be provided to define a Dairy department of a store, a "Snacks Department" class may be provided to define a Snacks department of a store, and the like.

One or more instances may be created from each class, for example, Wal-Mart Store objects may be instantiated from the "Wal-Mart Store" class, Eggs objects may be instantiated from the "Eggs" class, and the like. The object instantiations may be made persistent so that the states of the objects may be saved during a current session and reloaded from memory for future sessions. Each class may include indications of zero, one or more attributes associated with properties or characteristics of the class objects. The attribute values may be specified for a particular class object when the class is instantiated. A class may also include zero, one or more methods associated with the behavior exhibited by class objects at program run time. The methods may have access to data stored in a class object and may be able to control or set the attributes of the class object. In an exemplary embodiment, a class interface may be defined to provide a collection of methods common to two or more types of transportation resources.

Figure 13:
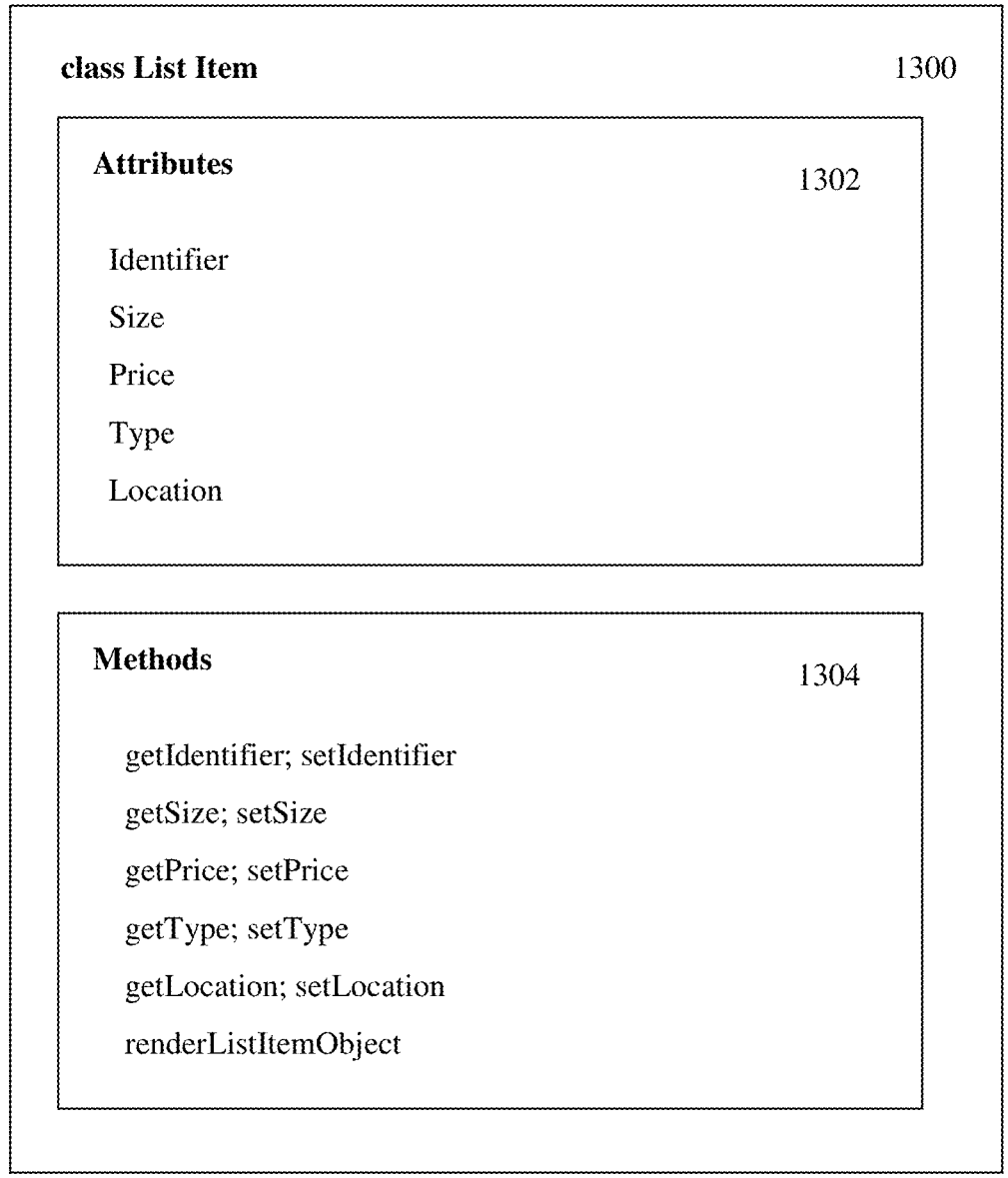
FIG. 13 illustrates a block diagram of an exemplary "List Item" class for defining a general shopping list item, e.g., milk, eggs, orange juice, etc.

FIG. 13 illustrates a block diagram of an exemplary "List Item" class 1300 for defining a general list item on a list, e.g., milk, eggs, orange juice, etc. One of ordinary skill in the art will recognize that any suitable class structure and class components may be used to define a general list item, and that such class structures and components are not limited to the illustrative embodiment of FIG. 13. One of ordinary skill in the art will also recognize that similar classes may be provided to define list items for any type of list including, but not limited to, shopping lists, activity lists, and the like. For example, exemplary list items for an activity list may include "go to the gym," "brush teeth," etc.

The class 1300 may include one or more attributes 1302 associated with a list item object including, but not limited to, an identifier, the size and/or volume (e.g., 1 liter), the price ($3.49), one or more types of the item (e.g., produce, furniture, etc.), the location in a store at which the item may be found (e.g., the Beverage department), and the like.

The class 1300 may include one or more methods 1304 associated with a list item object. Exemplary embodiments may provide a code generation module for generating code associated with the methods 1304. The code may be executed at run time to perform the functionality encapsulated in the methods 1304.

In exemplary embodiments, the class 1300 may include one or more "get" methods for obtaining the values of one or more attributes of a class object and one or more "set" methods for setting the values of one or more attributes of a class object. In an exemplary embodiment, a "getIdentifier" method and a "setIdentifier" method may allow obtaining and setting, respectively, the value of the "Identifier" attribute that designates the unique identifier of a list item object. A "getSize" method and a "setSize" method may allow obtaining and setting, respectively, the value of the "Size" attribute that designates the size, volume and/or weight associated with an list item object. A "getPrice" method and a "setPrice" method may allow obtaining and setting, respectively, the value of the "Price" attribute that designates the price associated with an list item object. A "getType" method and a "setType" method may allow obtaining and setting, respectively, the value of the "Type" attribute that designates one or more types of a list item object. A "getLocation" method and a "setLocation" method may allow obtaining and setting, respectively, the value of the "Location" attribute that designates a location in a store at which a list item object is typically found.

The class 1300 may include a "renderListItemObject" method that visually renders a representation of a list item object on a user interface. The "renderListItemObject" method may render the object representation on a list (e.g., the exemplary list illustrated in FIG. 6) and/or on a map (e.g., the exemplary map illustrated in FIGS. 11 and 12). Exemplary representations may include, but are not limited to, an icon (e.g., a general list item icon) rendered on the user interface to represent a list item object.

In an exemplary embodiment, a "renderListItemObject" method may render different representations for different object instantiations based on one or more attribute values including, but not limited to, the "Location" attribute, the "Size" attribute, and the like. In exemplary embodiments, the "renderListItemObject" method may use the "get" methods to obtain the values of one or more attributes, and may use the attribute values in customizing and/or updating the rendering of the representation of the class object. In an exemplary embodiment, the value of the "Identifier" attribute may be rendered on the user interface, for example, as a pop-up component associated with the representation, on the representation directly, and the like. In an exemplary embodiment, the value of the "Location" attribute may be used to render the object representation at a representation of its associated department on the map of a store.

FIG. 14 illustrates a block diagram of an exemplary "Orange Juice" class 1400 for defining an orange juice product item, e.g., a Tropicana™ orange juice product. One of ordinary skill in the art will recognize that any suitable class structure and class components may be used to define any type of product item, and that such class structures and components are not limited to the illustrative embodiment of FIG. 14.

The class 1400 may include one or more attributes 1402 associated with an orange juice product item object including, but not limited to, a unique identifier of the orange juice product item (e.g., the bar code, an alphanumeric identifier, etc.), the size and/or volume (e.g., 1 liter), the price ($3.49), the brand name of the manufacturer (e.g., Tropicana), one or more types of the item (e.g., fortified with vitamins, pulp-free, with pulp, low-acid, etc.), the type of the packaging (e.g., carton, glass bottle, plastic bottle, juice box, etc.), the location in a store at which the product item may be found (e.g., the Beverage department), nutritional information (e.g., a nutritional chart, an indication of whether the item is a low fat and/or a low sugar item, etc.), and the like.

The class 1400 may include one or more methods 1404 associated with an orange juice product item object. Exemplary embodiments may provide a code generation module for generating code associated with the methods 1404. The code may be executed at run time to perform the functionality encapsulated in the methods 1404.

In exemplary embodiments, the class 1400 may include one or more "get" methods for obtaining the values of one or more attributes of a class object and one or more "set" methods for setting the values of one or more attributes of a class object. In an exemplary embodiment, a "getIdentifier" method and a "setIdentifier" method may allow obtaining and setting, respectively, the value of the "Identifier" attribute that designates the unique identifier of an orange juice product item object. A "getSize" method and a "setSize" method may allow obtaining and setting, respectively, the value of the "Size" attribute that designates the size, volume and/or weight associated with an orange juice product item object. A "getPrice" method and a "setPrice" method may allow obtaining and setting, respectively, the value of the "Price" attribute that designates the price associated with an orange juice product item object. A "getBrand" method and a "setBrand" method may allow obtaining and setting, respectively, the value of the "Brand" attribute that designates the manufacturer brand associated with an orange juice product item object. A "getType" method and a "setType" method may allow obtaining and setting, respectively, the value of the "Type" attribute that designates one or more types associated with an orange juice product item object. A "getPackaging" method and a "setPackaging" method may allow obtaining and setting, respectively, the value of the "Packaging" attribute that designates one or more packaging types associated with an orange juice product item object. A "getLocation" method and a "setLocation" method may allow obtaining and setting, respectively, the value of the "Location" attribute that designates a location in a store at which an orange juice product item object is typically found. A "getNutrition" method and a "setNutrition" method may allow obtaining and setting, respectively, the value of the "Nutrition" attribute that designates nutritional information associated with an orange juice product item object.

The class 1400 may include a "renderOrangeJuiceObject" method that visually renders a representation of an orange juice product item object on a user interface. The "renderOrangeJuiceObject" method may render the object representation on a list (e.g., the exemplary list illustrated in FIG. 7) and/or a map (e.g., the exemplary map illustrated in FIGS. 11 and 12). Exemplary representations may include, but are not limited to, an icon (e.g., of an orange juice carton) rendered on the user interface to represent an orange juice product item object. In an exemplary embodiment, the "renderOrangeJuiceObject" method may be specific to the particular "Orange Juice" class so that orange juice product item objects are represented differently from objects of other classes (e.g., egg product items). For example, the "Orange Juice" class may include a "renderOrangeJuice" method that renders a first representation of an orange juice product item, while an "Egg" class may include a "renderEgg" method that renders a second different representation of an egg product item.

In an exemplary embodiment, a "renderOrangeJuiceObject" method may render different representations for different object instantiations based on one or more attribute values including, but not limited to, the "Brand" attribute, the "Size" attribute, the "Packaging" attribute, and the like. In exemplary embodiments, the "renderOrangeJuiceObject" method may use the "get" methods to obtain the values of one or more attributes, and may use the attribute values in customizing and/or updating the rendering of the representation of the class object. In an exemplary embodiment, the value of the "Identifier" attribute may be rendered on the user interface, for example, as a pop-up component associated with the representation, on the representation directly, and the like. In an exemplary embodiment, the value of the "Size" attribute may be used to customize the representation of the class object (for example, a gallon container may be represented by a larger than usual icon), or may be represented on the user interface, for example, in a pop-up component associated with the representation, on the representation directly, and the like. In an exemplary embodiment, the value of the "Location" attribute may be used to render the object representation at a representation of its associated department on the map of a store. In an exemplary embodiment, the value of the "Packaging" attribute may be used to render an object representation corresponding to a first type of packaging (e.g., bottle packaging) differently from an object representation corresponding to a second type of packaging (e.g., juice box packaging). In an exemplary embodiment, the value of the "Brand" attribute may be used to render an object representation corresponding to a first manufacturer brand (e.g., Tropicana) differently from an object representation corresponding to a second manufacturer brand (e.g., Dole).

IV. Exemplary Computing Devices

Figure 15:
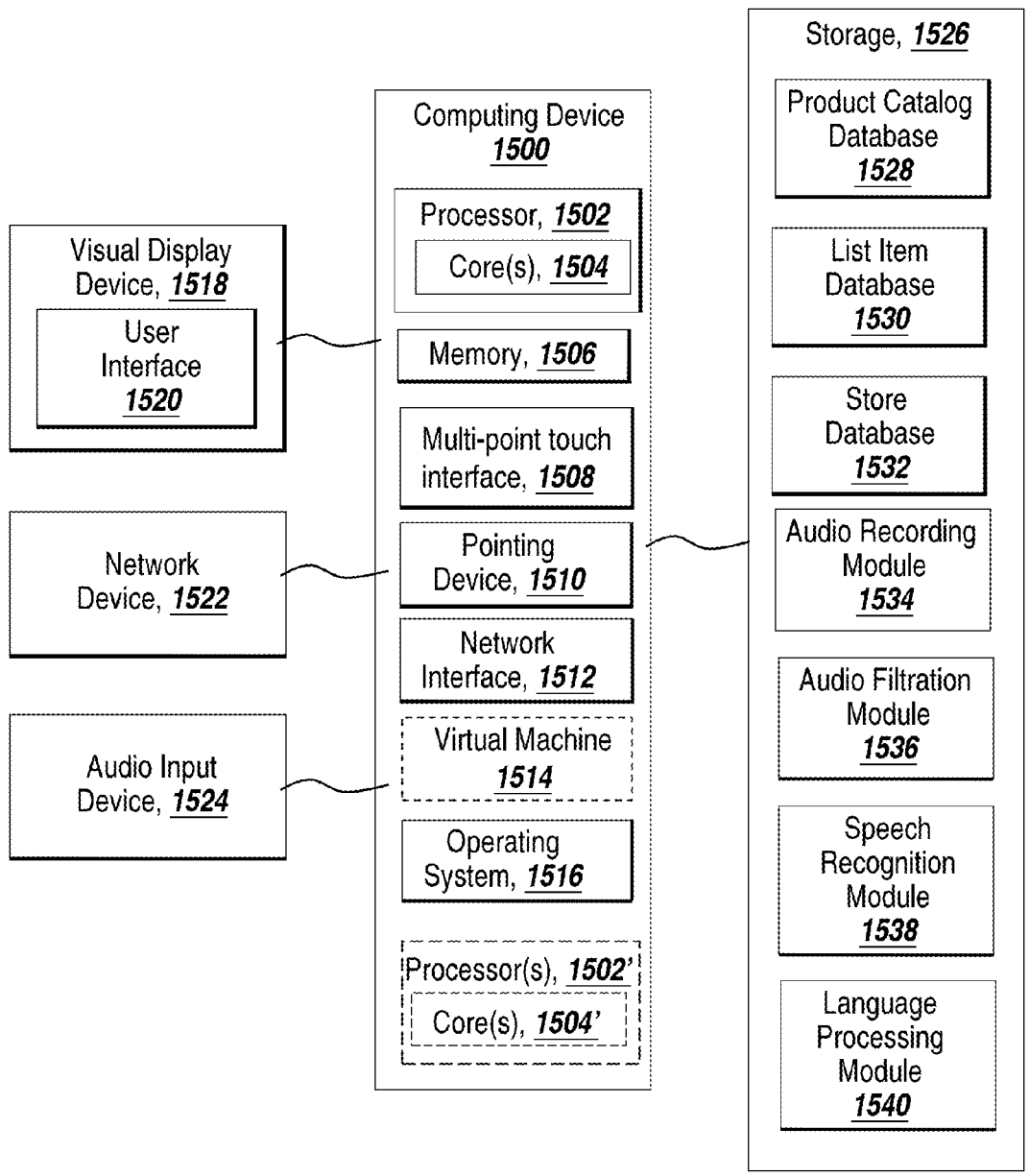
FIG. 15 is a block diagram of an exemplary computing device that may be used to perform any of the exemplary methods disclosed herein.

FIG. 15 is a block diagram of an exemplary computing device 1500 that may be used in to perform any of the methods provided by exemplary embodiments. The computing device 1500 may be any computer system, such as a workstation, desktop computer, server, laptop, handheld computer, tablet computer (e.g., the iPad™ tablet computer), mobile computing or communication device (e.g., the iPhone™ mobile communication device, the Android™ mobile communication device, and the like), or other form of computing or telecommunications device that is capable of communication and that has sufficient processor power and memory capacity to perform the operations described herein.

The computing device 1500 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more USB flash drives), and the like. For example, memory 1506 included in the computing device 1500 may store computer-readable and computer-executable instructions or software for implementing exemplary embodiments. The computing device 1500 also includes processor 1502 and associated core 1504, and optionally, one or more additional processor(s) 1502' and associated core(s) 1504' (for example, in the case of computer systems having multiple processors/cores), for executing computer-readable and computer-executable instructions or software stored in the memory 1506 and other programs for controlling system hardware. Processor 1502 and processor(s) 1502' may each be a single core processor or multiple core (1504 and 1504') processor.

Virtualization may be employed in the computing device 1500 so that infrastructure and resources in the computing device may be shared dynamically. A virtual machine 1514 may be provided to handle a process running on multiple processors so that the process appears to be using only one computing resource rather than multiple computing resources. Multiple virtual machines may also be used with one processor.

Memory 1506 may include a computer system memory or random access memory, such as DRAM, SRAM, EDO RAM, and the like. Memory 1506 may include other types of memory as well, or combinations thereof.

A user may interact with the computing device 1500 through a visual display device 1518, such as a screen or monitor, that may display one or more user interfaces 1520 that may be provided in accordance with exemplary embodiments. The visual display device 1518 may also display other aspects, elements and/or information or data associated with exemplary embodiments, for example, views of databases, store maps, geographical maps, and the like. The computing device 1500 may include other I/O devices for receiving input from a user, for example, a keyboard or any suitable multi-point touch interface 1508, a pointing device 1510 (e.g., a mouse, a user's finger interfacing directly with a display device, etc.). The keyboard 1508 and the pointing device 1510 may be coupled to the visual display device 1518. The computing device 1500 may include other suitable conventional I/O peripherals.

The computing device 1500 may include one or more audio input devices 1524, such as one or more microphones, that may be used by a user to provide one or more audio input streams.

The computing device 1500 may include one or more storage devices 1526, such as a hard-drive, CD-ROM, or other computer readable media, for storing data and computer-readable instructions and/or software that implement exemplary embodiments as taught herein. The storage device 1526 may be provided on the computing device 1500 or provided separately or remotely from the computing device 1500.

Exemplary storage device 1526 may also store one or more databases for storing any suitable information required to implement exemplary embodiments. The databases may be updated by a user or automatically at any suitable time to add, delete or update one or more items in the databases.

Exemplary storage device 1526 may store one or more product catalog databases 1528 for storing information on actual product items (e.g., identifiers, prices, quantities, and the like). The product catalog database 1528 may store mappings between list items and concepts (e.g., breakfast food, milk) and associated product items (e.g., Hood™ Fat Free Milk) Exemplary storage device 1526 may store one or more list item databases 1530 for storing information on list items (e.g., identifiers, types, and the like). Exemplary storage device 1526 may store one or more store databases 1532 for storing information on one or more stores, such as Wal-Mart stores (e.g., a store identifier, a store location, store departments, and the like).

Exemplary storage device 1526 may store computer-readable computer-executable instructions for implementing an audio recording module 1534, an audio filtration module 1536, a speech recognition module 1538 and a natural language processing module 1540.

The computing device 1500 may include a network interface 1512 configured to interface via one or more network devices 1522 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 1512 may include a built-in network adapter, network interface card, PCMCIA network card, card bus network adapter, wireless network adapter, USB network adapter, modem or any other device suitable for interfacing the computing device 1500 to any type of network capable of communication and performing the operations described herein. The network device 1522 may include one or more suitable devices for receiving and transmitting communications over the network including, but not limited to, one or more receivers, one or more transmitters, one or more transceivers, one or more antennae, and the like.

The computing device 1500 may run any operating system 1516, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. In exemplary embodiments, the operating system 1516 may be run in native mode or emulated mode. In an exemplary embodiment, the operating system 1516 may be run on one or more cloud machine instances.

V. Exemplary Network Environments

Figure 16:
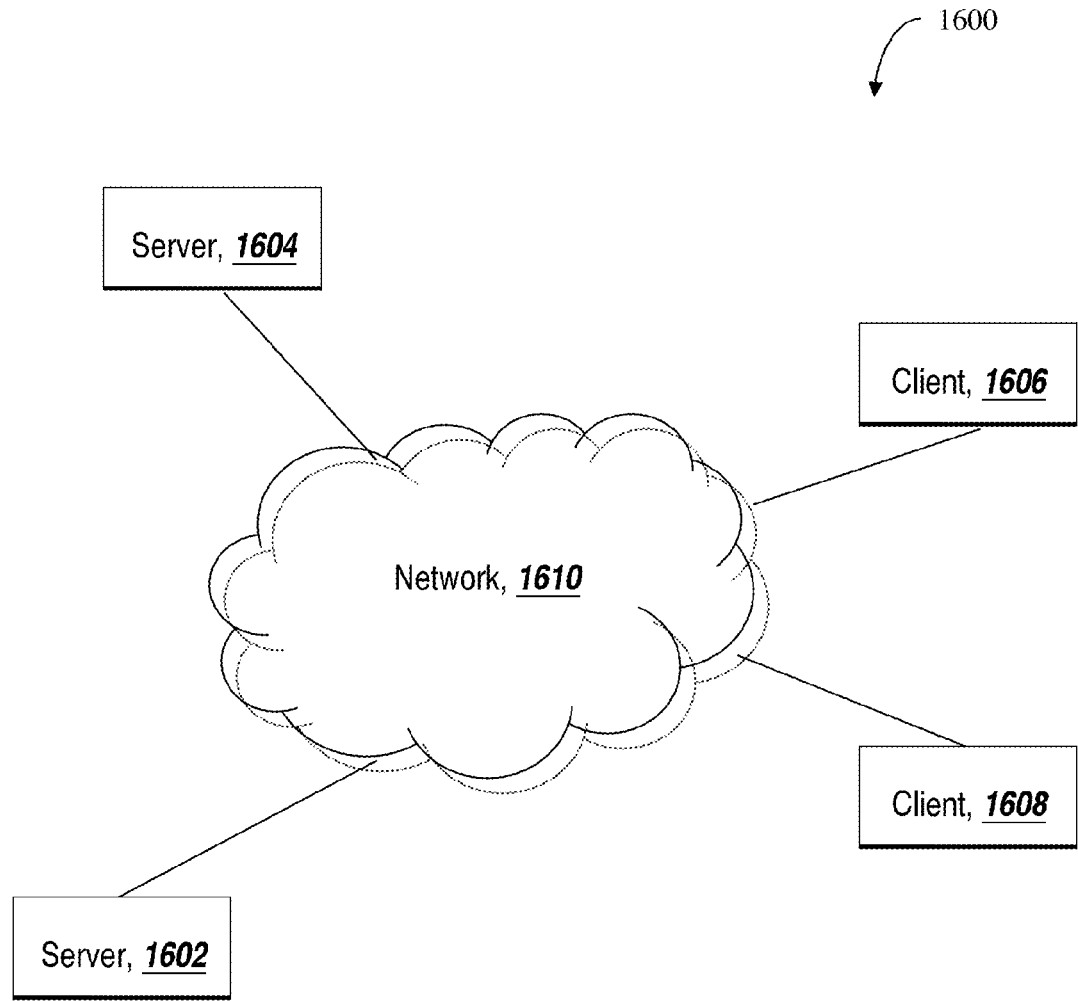
FIG. 16 is a diagram of an exemplary network environment suitable for a distributed implementation of exemplary embodiments.

FIG. 16 is a diagram of an exemplary network environment 1600 suitable for a distributed implementation of exemplary embodiments. The network environment 1600 may include one or more servers 1602 and 1604 coupled to one or more clients 1606 and 1608 via a communication network 1610. The network interface 1512 and the network device 1522 of the computing device 1500 enable the servers 1602 and 1604 to communicate with the clients 1606 and 1608 via the communication network 1610. The communication network 1610 may include, but is not limited to, the Internet, an intranet, a LAN (Local Area Network), a WAN (Wide Area Network), a MAN (Metropolitan Area Network), a wireless network, an optical network, and the like. The communication facilities provided by the communication network 1610 are capable of supporting distributed implementations of exemplary embodiments.

In an exemplary embodiment, the servers 1602 and 1604 may provide the clients 1606 and 1608 with computer-readable and/or computer-executable components or products under a particular condition, such as a license agreement. The computer-readable and/or computer-executable components or products may include those for providing and rendering an exemplary graphical user interface for rendering one or more lists. The clients 1606 and 1608 may provide and render an exemplary graphical user interface using the computer-readable and/or computer-executable components and products provided by the servers 1602 and 1604. In an exemplary embodiment, the clients 1606 and 1608 may transmit information on a list management operation performed by a user using the user interface to the servers 1602 and 1604 that may, in turn, automatically update the user interface based on the user operation.

Alternatively, in another exemplary embodiment, the clients 1606 and 1608 may provide the servers 1602 and 1604 with computer-readable and computer-executable components or products under a particular condition, such as a license agreement. The computer-readable and/or computer-executable components or products may include those for providing and rendering an exemplary graphical user interface for rendering one or more lists. The servers 1602 and 1604 may provide and render an exemplary graphical user interface using the computer-readable and/or computer-executable components and products provided by the clients 1606 and 1608. In an exemplary embodiment, the servers 1602 and 1604 may transmit information on a list management operation performed by a user using the user interface to the clients 1606 and 1608 that may, in turn, automatically update the user interface based on the user operation.

VI. Equivalents

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other aspects, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

What is claimed is:

1. A computer-implemented method for allowing creation and management of a list on a mobile computing device, the method comprising: rendering a user interface on a display device of the mobile computing device; receiving user input from a user for creating a list; receiving an audio input stream from the user at an audio input device of the mobile computing device, the audio input stream including a sequence of a plurality of list items spoken by the user; in response to receipt of the audio input stream at the audio input device, calling a speech processing engine from the user interface to process the audio input stream into input text and to parse the input text into one or more n-grams; rendering representations of the one or more n-grams on the user interface to allow the user to accept, reject and/or edit the one or more n-grams for representation in the form of a list; and in response to user input accepting the one or n-grams, rendering a list on the user interface in which each n-gram is represented as a separate list item.

2. The method of claim 1, further comprising: automatically determining one or more product items corresponding to a list item; allowing the user to select at least one of the one or more product items using the user interface; and in response to user selection of at least one of the one or more product items, rendering representations of the at least one of the one or more selected product items on the user interface.

3. The method of claim 2, further comprising: providing information on a product item on the user interface, the information including one of a price of the product item, a brand name of the product item, and a review of the product item, a rating of the product item.

4. The method of claim 2, wherein the automatic determining of the one or more product items is based on one or more prior product item selections made by the user.

5. The method of claim 2, wherein the automatic determining of the one or more product items is based on one or more products available at a store location corresponding to the user and/or a store location corresponding to a location of the user.

6. The method of claim 1, further comprising: receiving user input at the user interface to merge representations of two or more selected list items into a representation of a merged list item; and in response to the user input to merge the representations, updating the list rendered on the user interface to remove representations of the two or more selected list items and to include the representation of the merged list item.

7. The method of claim 1, further comprising: receiving user input at the user interface to split a representation of a selected list item into representations of two or more split list items; and in response to the user input to split the representation, updating the list rendered on the user interface to remove the representation of the selected list item and to include the representations of the two or more split list items.

8. The method of claim 1, further comprising: rendering a map of a store on the user interface; and rendering representations of the list items on representations on the map of corresponding geographical locations in the store at which the list items are available.

9. The method of claim 8, further comprising: rendering a route on the map that connects the representations of the list items to indicate a path to follow in picking up the list items in the store.

10. The method of claim 1, further comprising: removing one or more stop words and/or one or more words of hesitation from the input text before the one or more n-grams are generated.

11. The method of claim 1, further comprising: removing audio noise from the audio input stream before processing the audio input stream at the speech processing engine.

12. A mobile computing system, comprising: an audio input device for receiving audio input; a visual display device configured to display one or more user interfaces; and a processor programmed to: render a user interface on the visual display device, receive user input from a user for creating a list, receive an audio input stream from the user at the audio input device, the audio input stream including a sequence of a plurality of list items spoken by the user, in response to receipt of the audio input stream at the audio input device, call a speech progressing engine from the user interface to process the audio input stream into input text and to parse the input text into one or more n-grams, render representations of the one or more n-grams on the user interface to allow the user to accept, reject and/or edit the one or more n-grams for representation in the form of a list, and in response to user input accepting the one or n-grams, render a list on the user interface in which each n-gram is represented as a separate list item.

13. The mobile computing system of claim 12, wherein the processor is further programmed to: render a map of a store on the user interface; and render representations of the list items on representations on the map of corresponding geographical locations in the store at which the list items are available.

14. The mobile computing system of claim 12, wherein the processor is further programmed to: render a route on the map that connects the representations of the list items to indicate a path to follow in picking up the list items in the store.

15. One or more non-transitory computer-readable media encoded with computer-executable instructions for performing a method for allowing creation and management of a list on a mobile computing device, the method comprising: rendering a user interface on a display device of the mobile computing device; receiving user input from a user for creating a list; receiving an audio input stream from the user at an audio input device of the mobile computing device, the audio input stream including a sequence of a plurality of list items spoken by the user; in response to receipt of the audio input stream at the audio input device, calling a speech processing engine from the user interface to process the audio input stream into input text and to parse the input text into one or more n-grams; rendering representations of the one or more n-grams on the user interface to allow the user to accept, reject and/or edit the one or more n-grams for representation in the form of a list; and in response to user input accepting the one or n-grams, rendering a list on the user interface in which each n-gram is represented as a separate list item.

16. The one or more non-transitory computer-readable media of claim 15, wherein the method further comprises: rendering a map of a store on the user interface; and rendering representations of the list items on representations on the map of corresponding geographical locations in the store at which the list items are available.

17. The one or more non-transitory computer-readable media of claim 15, wherein the method further comprises: rendering a route on the map that connects the representations of the list items to indicate a path to follow in picking up the list items in the store.

18. A computer-implemented method for a mobile computing device, comprising: receiving a list of items; rendering a map of a store on a user interface displayed on a visual display device of the mobile computing device; rendering representations of the list items on representations on the map of corresponding geographical locations in the store at which the list items are available; rendering a route on the map that connects the representations of the list items to indicate a path to follow in picking up the list items in the store; rendering a second user interface on the visual display device of the mobile computing device; receiving user input from a user for creating a list; receiving an audio input stream from the user at an audio input device of the mobile computing device, the audio input stream including a sequence of a plurality of list items spoken by the user; in response to receipt of the audio input stream at the audio input device, calling a speech processing engine from the user interface to process the audio input stream into input text and to parse the input text into one or more n-grams; rendering representations of the one or more n-grams on the second user interface to allow the user to accept, reject and/or edit the one or more n-grams for representation in the form of a list; and in response to user input accepting the one or n-grams, rendering a list on the second user interface in which each n-gram is represented as a separate list item.

19. The method of claim 18, further comprising: automatically determining one or more product items corresponding to a list item; allowing the user to select at least one of the one or more product items using the second user interface; and in response to user selection of at least one of the one or more product items, rendering representations of the at least one of the one or more selected product items on the second user interface.

20. The method of claim 18, further comprising: automatically determining the store based on its proximity to the mobile computing device.

21. The method of claim 18, further comprising: changing the rendering of the map based on a location of the mobile computing device.

\* \* \* \* \*